(12) United States Patent
Jakobson et al.

(10) Patent No.: US 8,646,103 B2
(45) Date of Patent: Feb. 4, 2014

(54) METHOD AND SYSTEM FOR SECURING ONLINE IDENTITIES

(76) Inventors: Gabriel Jakobson, Las Vegas, NV (US); Steven Rueben, Las Vegas, NV (US)

( * ) Notice: Subject to any disclaimer, the term of this patent is extended or adjusted under 35 U.S.C. 154(b) by 1172 days.

(21) Appl. No.: 12/217,247

(22) Filed: Jun. 30, 2008

(65) Prior Publication Data

US 2009/0328173 A1    Dec. 31, 2009

(51) Int. Cl.
*H04L 9/32*     (2006.01)
*G06F 7/04*     (2006.01)

(52) U.S. Cl.
USPC .............................................. 726/29; 726/30

(58) Field of Classification Search
None
See application file for complete search history.

(56) References Cited

U.S. PATENT DOCUMENTS

| | | | |
|---|---|---|---|
| 6,213,391 B1 | 4/2001 | Lewis | |
| 2002/0019764 A1* | 2/2002 | Mascarenhas | 705/10 |
| 2003/0004819 A1* | 1/2003 | Dutta et al. | 705/26 |
| 2005/0188421 A1* | 8/2005 | Arbajian | 726/4 |
| 2006/0085454 A1* | 4/2006 | Blegen et al. | 707/100 |
| 2007/0255643 A1* | 11/2007 | Capuano et al. | 705/37 |

OTHER PUBLICATIONS

U.S. Appl. No. 10/686,767, filed Jul. 2004, Cohen, 8-12.
U.S. Appl. No. 10/458,079, filed Jun. 2003, Van Horn, 7-18.

* cited by examiner

*Primary Examiner* — Venkat Perungavoor

(57) ABSTRACT

Various methods, systems and apparatus for associating fictitious user identities (e.g. screen names, user names, handles, etc.) used in electronic communications (e.g. over the internet or mobile networks via instant messenger, e-mail, social networks, eCommerce and auction websites, etc.) with real personal information (e.g. the true identity of an individual such as their name, address, credit score, driving record, etc.) are disclosed. One apparatus, according to aspects of the present invention, may include means of associating real personal information, submitted by a user, with fictitious user identities, means of verifying the real personal information and the ownership of the real personal information by the submitting user, and means of receiving a request for some personal information associated with a fictitious user identity, from a remote user, abstracting a user's true identity from information associated with them.

11 Claims, 16 Drawing Sheets

METHOD AND SYSTEM FOR SECURING ONLINE IDENTITIES

FIELD OF INVENTION

The present invention relates to online computing. More particularly, the present invention provides a method and system for associating user identities ("fictions screen names"), used in connection with internet browsing/online activities, with one another; and, with the real identity of the person ("user") using the fictitious screen names. The present invention may mask the identity of a user while associating information related to the user with one or more of the fictitious screen names used by the user.

BACKGROUND OF THE INVENTION

Users of computing devices connected to a network (e.g. internet, instant messaging, etc.) often use fictitious screen names as unique handles ("screen names"). Users use screen names to identify themselves to other users and online services. An individual user may have multiple screen names. Screen names may be used in online chatting (e.g. instant messenger, chat rooms, etc.), social networking websites (e.g. blogs, MySpace™, Facebook™, etc.) e-commerce/online marketplaces (e.g. eBay, Amazon, etc.) etc.

In addition to acting as unique handles for online users, screen names may also protect the anonymity of the users using them. The true identity of an online user is often masked by the screen name he/she is using. Information pertaining to the true identity of the individual behind a screen name may be limited to the information provided by that individual (which, by the nature of the internet, is often scant and may not be truthful.) An individual may have one or more screen names for every online service they use. For example, a user may create multiple personas in an online-auction website, each persona identified by a different screen name. In this example, other users interacting with the various screen names/personas of this one user may be unaware they are dealing with the same person.

Targeted advertising is often targeted to individual users based on a variety of attributes known about the user (e.g. the user's demographic information, shopping habits, credit worthiness, etc.) A fictitious screen name may mask the real identity of the user using the screen name, thus preventing content-targeted advertising from reaching the user while using his/her fictitious screen name. In addition, at present there is no way for advertisers to correlate the disparate screen names used by a user, such that all attributes of individual screen names are known to an advertiser.

SUMMARY OF THE INVENTION

The present invention provides a method and system for associating user identities ("fictions screen names" or "screen names"), used in connection with internet browsing/online activities, with one another; and, with the real identity of the person ("user") using the fictitious screen names. The present invention may mask the real identity of a user while associating information related to the user with screen names used by the user.

A Global Identity Certification Service ("GICS") may include one or more GICS servers each having a Certified Global Identity ("CGI") database containing multiple CGIs. A CGI may aggregate information associated both with the real user and with fictitious screen names used by the user. The GICS may collect and validate personal information from a user (e.g. credit card, banking and financial information, social security number, drivers license information, information pertaining to ecommerce, travel, health, etc.) Validated user information may be stored in the user's CGI. Screen names registered by the user, as well information aggregated from the usage of these screen names, may be stored in the CGI.

A remote user, communicating with a first user via one of the first user's screen names, may obtain information associated with the first user—and/or associated with one or more of the first user's other screen names—from the first user's CGI. The information the remote user obtains may not compromise the identity of the first user and/or the other screen names the first user may be using. Information contained in a user's CGI may be used for enhanced content-targeted advertising, where information known about a user, and/or a user's other screen names, may be used to better target advertisements to a user's screen name. Information associated with a user, contained in the user's CGI, may be used to filter and block online communications (e.g. instant messages, emails, etc.) from the user.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1:
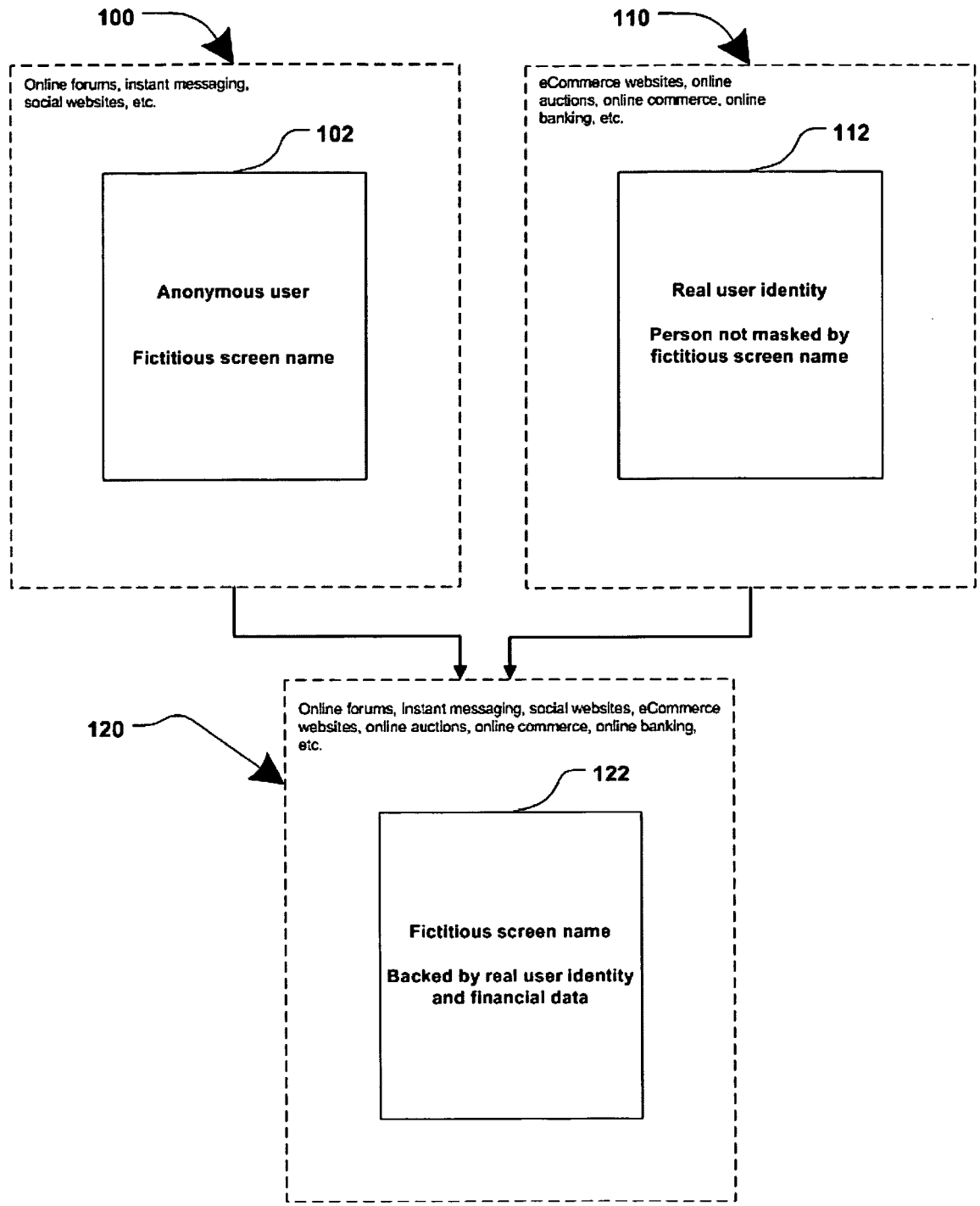
FIG. 1 is a generalized block diagram illustrating the transfer and display of location-information in various applications, onto a mapping application, according to one embodiment.

FIG. 1 is a generalized block diagram illustrating an online system in which a user's fictitious screen name may be associated with the user's real personal information, according to one embodiment. At present, an online user may either remain substantially anonymous, using a fictitious screen name which may not be traceable to the real person; or, the online user may have to reveal their true identity and personal information (e.g. to conduct online transactions.) The present invention offers an alternative where a user's true identity may remain unknown, yet attributes of their personal information may be made known through screen names associated with the user's true identity.

Block 100 represents a common way, in prior art, for a user to interact online in blogs and forums, instant messaging and chat rooms, social networking and dating websites, auction websites, etc. A user's fictitious online identity 102 may be represented by a fictitious screen name. Information associated with fictitious online identity 102 may be limited and not readily available. For example, a user may obtain one fictitious screen name identifying the user in an auction website, and another fictitious screen name identifying the user in an instant messaging network. The true identity of the user associated with the screen names may not be known to other users interacting with the user via these fictitious screen names.

Block 110 represents a common way, in prior art, for a user to interact online with financial institutions, buyers and sellers, professional service providers, etc. A user's true identity 112 may be made known to another online user, or online entity, with whom the user is interacting. For example, a user may provide his/her identity information, such as valid credit card number and billing address, to conduct a financial transaction online. In another example, a user may provide their name, address and some personal/financial information to a buyer or seller in an online auction. Thus, the inventive system allows the user to vary the level of personal information being distributed based upon the interactions being performed.

In the presently-preferred embodiment of this invention, block 120 represents the combination of the fictitious screen name, provided by the online user, with personal/financial information known about the online user. The online user may submit verifiable personal/financial information to be associated with the fictitious screen name. A remote user, or entity, interacting with the online user via the user's fictitious screen name, may be privy to some personal information associated with the online user's fictitious screen name, while not knowing the online user's true identity.

Users may be able to control which information is available based upon the interaction being performed. For example, a user may associate their verified consumer credit score (e.g. 750) with a fictitious screen name used in online auctions (e.g. "ebay_king_123".) A remote user interacting online with the fictitious screen name ebay_king_123 may know the consumer credit score of the individual using screen name ebay_king_123 is 750; but, the remote user may not know any other personal information identifying the user using the fictitious screen name ebay_kind_123 (e.g. their real name, social security number, or any other information required to obtain a person's credit score.)

Figure 2:
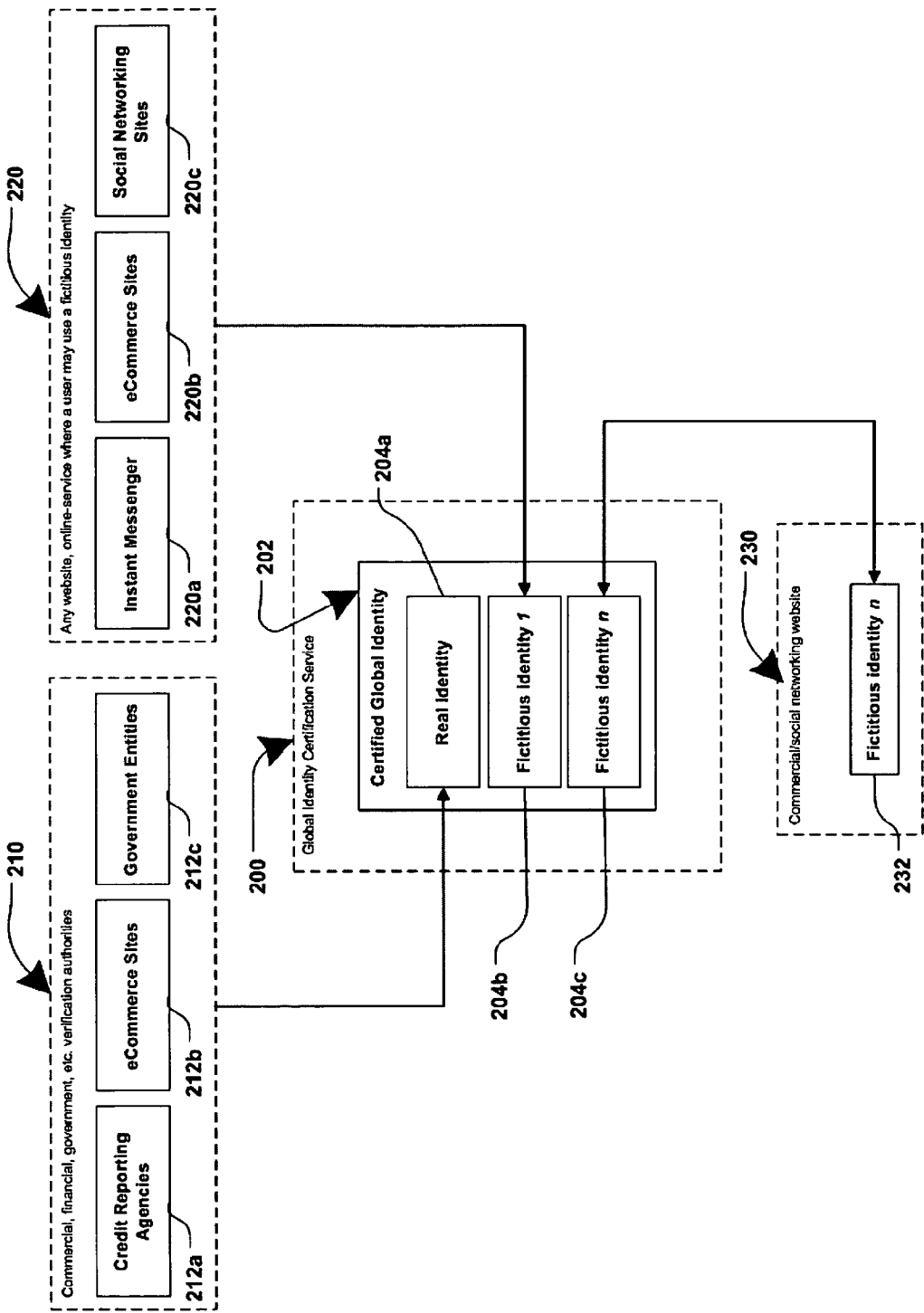
FIG. 2 is a generalized block diagram illustrating an online system in which a user's fictitious screen names/identities may be associated with the user's personal information, according to one embodiment of the present invention.

FIG. 2 is a generalized block diagram illustrating an online system in which a user's fictitious screen names/identities may be associated with the user's personal information, according to one embodiment of the present invention. Real information pertaining to an online user, may be certified and associated with online fictitious identities/screen names ("fictitious identity") certified as "owned" used by the user (i.e. the online user may register a fictitious identity as being owned and used exclusively by them. For example, it may be verified that the user is the exclusive user of an online instant messenger screen name used exclusively by the user.) This exclusive use of the fictitious identities may be verified on one or more systems including social networks, eCommerce, government, transactional, financial and confidential information web sites, etc.

A Global Identity Certification Service ("GICS") 200 (e.g. an independent online service, a service offered by online portals and services, etc.) may include one or more GICS servers coupled to a database containing Certified Global Identities ("CGI") 202 for users. The CGI 202 may contain certified (i.e. verified by a known authority) information associated with a person, such as the person's real identity 204a (e.g. "Joe Doe" for name and any other personal/financial information, etc.) The CGI 202 may also contain fictitious identities 204b and 204c (e.g. "Fictitious Identity I", "Fictitious Identity n" and any information associated with these fictitious identities.) In the presently-preferred embodiment, any number of identities/screen names may be registered with the CGI 202.

In the presently-preferred embodiment, information pertaining to a user's real identity 204a in the CGI 202, may be provided and/or certified by various authorities and entities 210. For example, a credit reporting agency 212a may provide the credit score of the user (based on the user's real identity 204a); eCommerce websites may provide information pertaining to online transactions conducted by the user; government entities such as the Department of Motor Vehicles may provide the driving record of the user, etc. Information aggregated into the CGI 202, based on the user's real identity 204a, may be kept confidential.

In the presently-preferred embodiment, information pertaining to the user's various fictitious identities 204b and 204c, may be aggregated into the CGI 202 from multiple online entities 220, such as instant messenger 220a, eCommerce websites 220b, social networking websites 220c, etc. For example, a user using an online screen name "Fictitious Identity I" 204b may receive online surfing/interaction/ecommerce-related information and feedback from online entities 220. The information received may be stored in the user's CGI 202.

Information aggregated by the CGI 202 may be made available (in whole or in part, depending on specific rules and policies in various embodiments) to remote users and identities 230, inquiring via any of the identities 204a, 204b, 204c registered with the CGI 202. For example, a commercial or social-networking website 230, communicating with a user via the user's screen name "fictitious identity n" 232, may have access to information aggregated by the CGI 202 from other the identities 204a, 204b registered by the user. In this example, the social networking website 230 may contain targeted advertising which may be shown to the screen name "fictitious identity n" 232 based on the credit score provided by the credit reporting agency 212a and associated with the user in the CGI 202.

In the presently-preferred embodiment, the social networking website 230 may not have access to the real identity 204a of the user using screen name "fictitious identity n"; but, the social networking website 230 may have access to various attributes of the real identity 204a, such as the user's credit score, driving record, etc. This information may provide useful information about the user such as his financial status, age, driving proficiency, etc. which can be useful in estimating trust and reliability of the associated user even through the true identify is not disclosed.

In alternate embodiments, the CGI 202 may transform various attributes gathered from its registered identities 204a, 204b, 204c into a new set of parameters which may be shared with remote entities. For example, the CGI 202 may derive a new parameter, "auction worthiness" by combining the user's credit score with various feedback and statistics from auction websites and auction-related transactions conducted by the user, while the user uses other fictitious identities.

Figure 3:
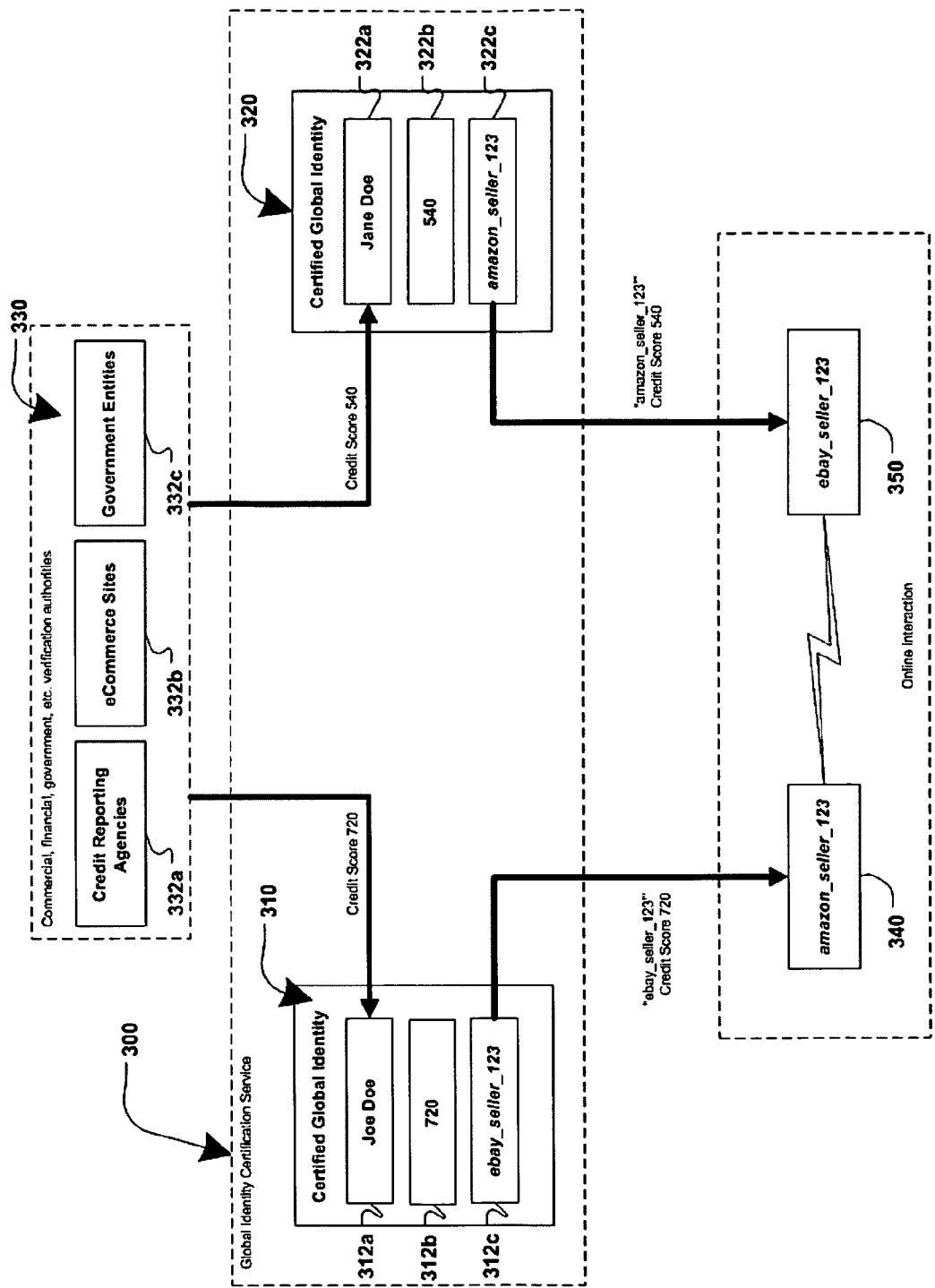
FIG. 3 is a generalized block diagram illustrating an online interaction between two users using fictitious screen names, according to one embodiment of the present invention.

FIG. 3 is a generalized block diagram illustrating an online interaction between two users using fictitious screen names, according to one embodiment of the present invention. Users using fictitious screen names to interact online, may not each know the real identity of the other user; however, they may have access to attributes associated with the true identity of the other user.

For example, an online user with the screen name "amazon_seller_123" 340 may interact online with a remote user with the screen name "ebay_seller_123" 350. A GICS 300 may contain CGIs 310 and 320. Both the CGIs 310 and 320 may be accessible to the users of screen names "amazon_seller_123" 340 and "ebay_seller_123" 350.

The CGI 310 may contain identity information associated with the user "ebay_seller_123" 350: e.g. the user's real name "Joe Doe" 312a, the user's credit score "720" 312b, the user's fictitious screen name "ebay_seller_123" 312c, etc. In the presently-preferred embodiment, the credit score 312b, and other attributes of the user "Joe Doe" 312a, may be obtained from online entities of authority 330, for example, credit reporting agencies 332a, eCommerce websites 332b, governmental entities 332c, etc. In alternate embodiments, attributes associated with user "Joe Doe" 312a may be obtained by other means and/or from other sources.

The CGI 320 may contain identity information associated with the user "amazon_seller_123" 340: the user's real name "Jane Doe" 322a, the user's credit score "540" 322b, the user's fictitious screen name "amazon_seller_123" 322c, etc. In the presently-preferred embodiment, the credit score 322b, and other attributes of the user "Jane Doe" 322a, may be obtained from online entities of authority 330, for example, credit reporting agencies 332a, eCommerce websites 332b, governmental entities 332c, etc. In alternate embodiments, attributes associated with user "Jane Doe" 322a may be obtained by other means and/or from other sources.

The user of the fictitious screen name "amazon_seller_123" 340 may inquire with the GICS 300 to obtain information associated with the fictitious screen name "ebay_seller_123" 350, in CGI 310 (e.g. the inquiry may be made online, via an internet protocol request, etc.) For example, the user of the fictitious screen name "amazon_seller_123" 340 may obtain the credit score "720" of the user of fictitious screen name "ebay_seller_123" 350.

The user of the fictitious screen name "ebay_seller_123" 350 may inquire with the GICS 300 to obtain information associated with the fictitious screen name "amazon_seller_123" 340, in CGI 320. (e.g. the inquiry may be made online, via an internet protocol request, etc.) For example, the user of the fictitious screen name "ebay_seller_123" 340 may obtain the credit score "540" of the user of the fictitious screen name "amazon_seller_123" 340.

In this example, both online users 340 and 350 may obtain the credit score of the other user—without obtaining the true identity of the other user. The user of the screen name "amazon_seller_123" 340 may obtain the credit score, "720" 312b, of the user of the fictitious screen name "ebay_seller_123" 350 but may not obtain the name, "Joe Doe" 312a, of the user of the fictitious screen name "ebay_seller_123" 350.

In the presently-preferred embodiment, personal information obtained about a user from the entities 330 may not be alterable by the user. In various possible embodiments, a user may exercise various degrees of control, and may set rules regulating the information associated with him/her that may be shared with remote users requesting information from the user's CGI.

Figure 4:
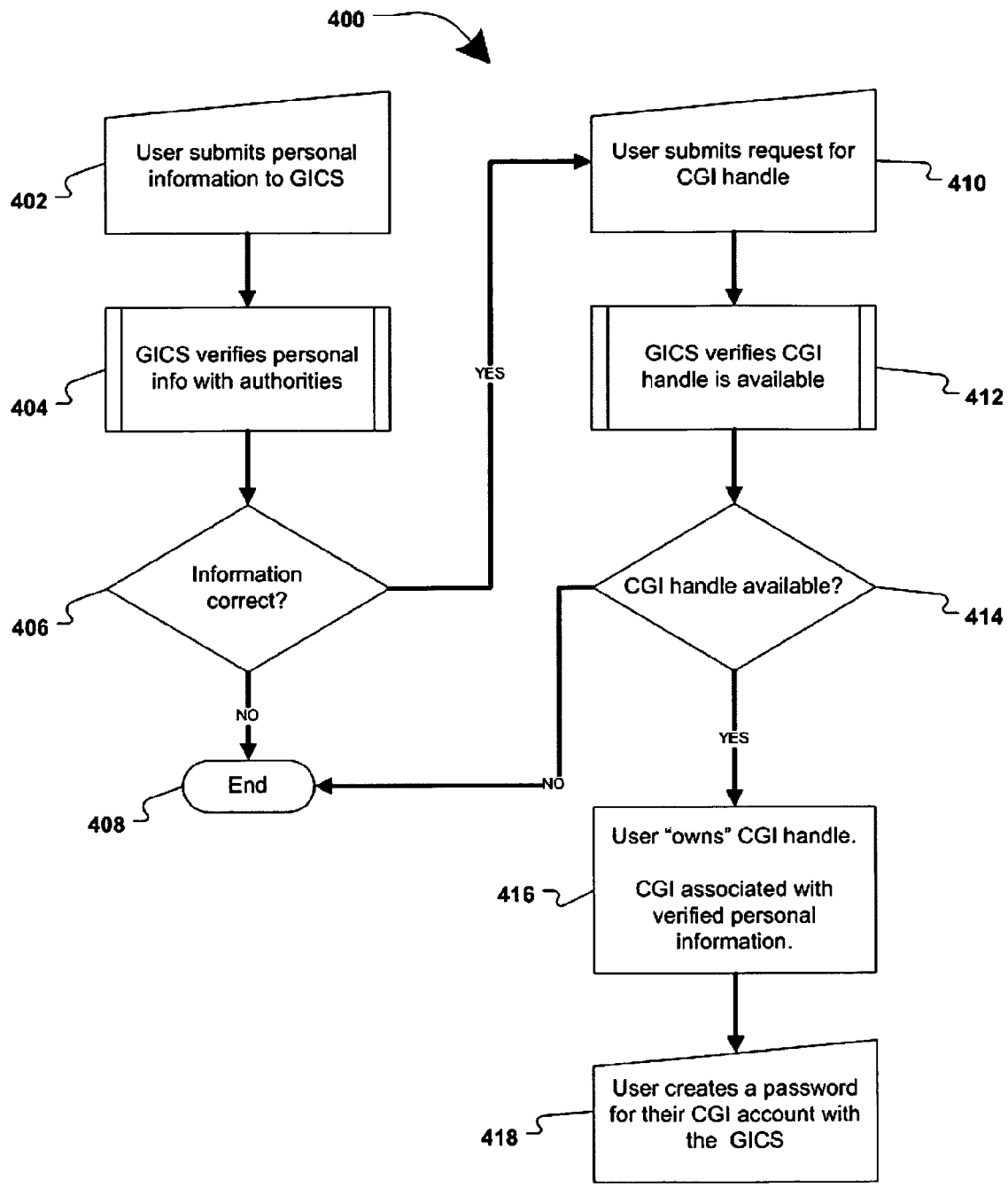
FIG. 4 is a generalized flow diagram illustrating a user's registration of a new CGI account or handle ("CGI handle"), according to one embodiment of the present invention.

FIG. 4 is a generalized flow diagram illustrating a user's registration of a new CGI account ("CGI account") or handle ("CGI handle"), according to one embodiment of the present invention. A user's CGI handle must be unique. A CGI handle may be in the form of an alpha-numeric string of characters, or any other form that ensures uniqueness from other CGI handles. In the presently-preferred embodiment, a CGI handle may be human-readable (i.e. reasonably short in length and containing visible characters such that a user may read and type the CGI handle with a reasonable degree of ease.) In alternate embodiments, a CGI handle may be machine-readable (i.e. a long string of random characters which may or may not be visible, designed to be transmitted electronically between electronic devices and software applications.)

In flow 400, a user may provide verifiable, personal information and submit a request for a unique CGI handle. The information may be provided to a GICS which may handle the task of issuing and/or maintaining CGIs. At step 402, the user may submit personal information that may be verified with online entities/authorities, to authenticate the user's identity. For example, the user may submit one or more of the following items: credit card account number and mailing address, drivers license number, social security number, current and previous addresses of residence, etc.

At step 404, the user's identity may be verified with entities/authorities capable of verifying personal information. For example, the user's driver's license number and address may be verified with the department of motor vehicles, the user's financial information may be verified with credit reporting agencies, etc.

At step 406, the validity of the user's identity may be determined. For example, previous addresses of residence entered by the user, may be compared with residences on the user's credit report, obtained based on the social security number entered at step 402. If at step 406 the user's identity is not validated, the user may not be allowed to proceed at step 408.

In alternate embodiments, steps 402 and 404 may be bypassed with the use of biometric, electronic-identity or other methods, verifying the user's identity.

If the user's identity is verified at step 406, at step 410 the user may request a CGI handle.

At step 412, the GICS may verify the availability of the CGI handle requested by the user. Alternatively, the GICS may assign a CGI handle to the user or may list numerous available CGI handles for the user to choose from.

If at step 414 it is determined the CGI handle is available, at step 416 the CGI handle may be registered to the user as his/her unique handle. At step 418 the user may create a password associated with their CGI handle/account. In alternate embodiments, various algorithms and methods may be used to allow a user to create an account and password for accessing their CGI.

In the presently-preferred embodiment, personal user information received at step 402, may be saved securely in association with the user's new CGI handle assigned at step 416. In alternate embodiments, some, or all, of the personal information received from the user at step 402, may be discarded after the completion of step 404, once the information has been used to validate the user's authenticity.

Figure 5:
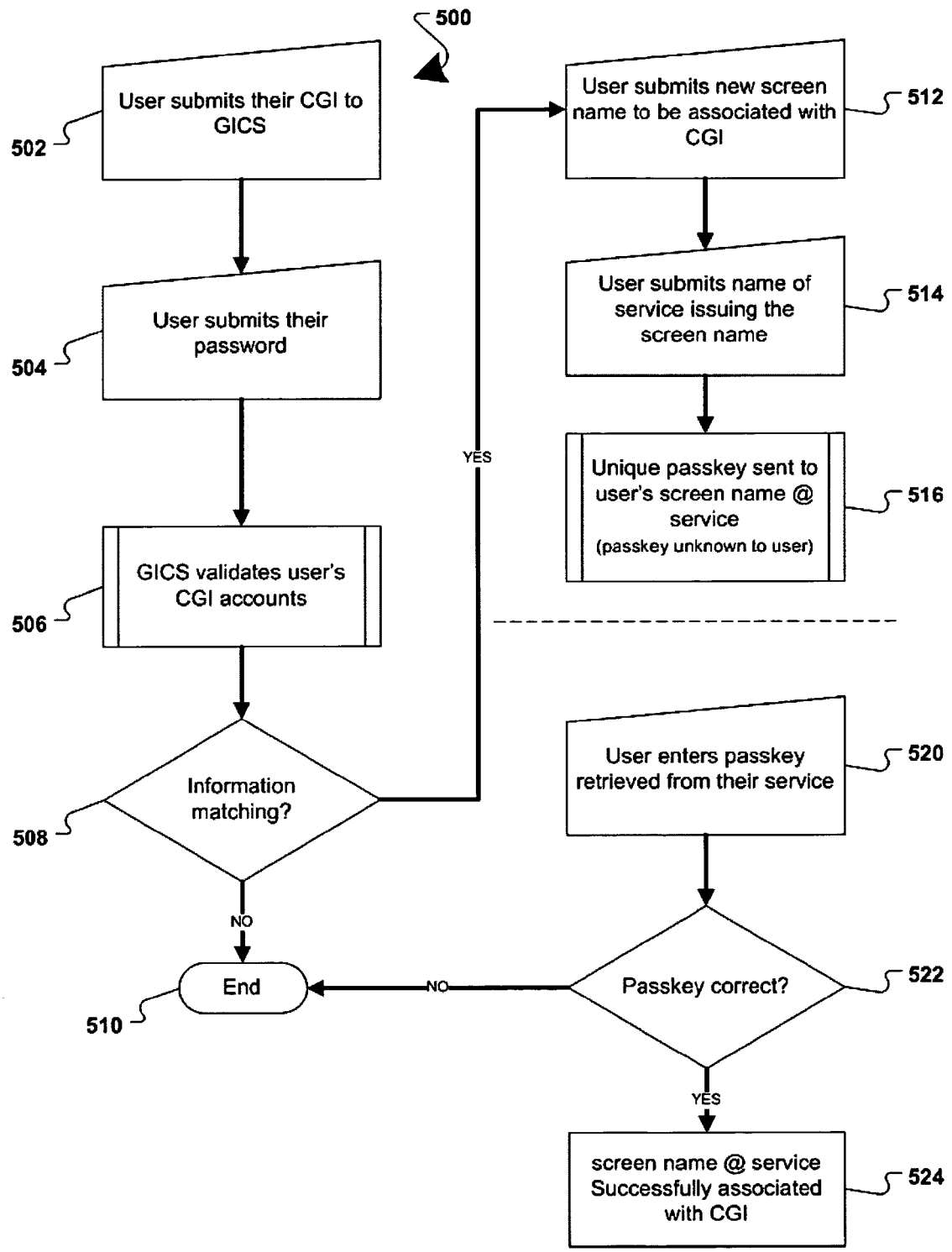
FIG. 5 is a generalized flow diagram illustrating a user's registration of a new screen name ("screen name") with an existing CGI account or CGI handle according to one embodiment of the present invention.

FIG. 5 is a generalized flow diagram illustrating a user's registration of a new screen name with an existing CGI account or CGI handle, according to one embodiment of the present invention. A user's screen name may be issued by a third-party online service (e.g. instant messaging service, auction website, ecommerce website, social networking website, etc.) Once the user has authenticated themselves to their CGI account (e.g. provided by the GICS) and has proven their ownership of a screen name (e.g. provided by a third-party service), the screen name may be associated with the user's CGI account.

At steps 502, 504 and 506, the user may log into their GICS account with their CGI credentials. For example, the user may submit their CGI handle at step 502, and CGI password at step 504. At step 506 the inputted handle and password may be verified by the GICS and if the information is not correct, the user may be prevented from proceeding, at step 510.

If at step 508 it is determined that the user's CGI handle and password match, at step 512 the user may submit a new screen name to be associated with the user's CGI handle. At step 514 the user may submit the name of the third-party online service which had issued the screen name to the user. For example, a user with an account with Amazon.com®, registering their screen name "amazon_seller_123" may enter their screen name, "amazon_seller_123" at step 512, and the third-party online service name "amazon.com" at step 514.

At step 516 a passkey (i.e. unique combination of alphanumeric characters, unknown to the user) may be sent (e.g. via email, text message, voicemail, etc.) to the user's account at the third-party online service specified at step 514. The user may retrieve the passkey sent to their account, hosted by the third-party online service, associated with their screen name.

At step 520, the user may input the passkey retrieved from their account under their screen name, and at step 522 it may be determined whether the passkey provided to the GICS by the user at step 520, is correct (i.e. matches the passkey sent to the user at step 516.)

If it is determined at step 522 that the passkey inputted by the user is correct, at step 524 the screen name may be associated with the user's CGI handle.

In the presently-preferred embodiment, the user's retrieving the passkey from the user's account with the third-party online service, may serve as evidence the user is the owner of the screen name entered at step 512. In alternate embodiments, other methodologies may be used to ascertain that a user submitting a screen name for association with their CGI handle, is the valid owner of that screen name.

In the presently-preferred embodiment, the association of a screen name with a user's CGI handle may allow remote users to treat additional information associated with the user's CGI handle (e.g. personal information, financial information, information pertaining to other screen names associated with this CGI handle, etc.) as being validly associated with the screen name.

For example, User A may choose to register his screen name "amazon_seller_123" with his CGI handle. User A may also register other screen names he has exclusive ownership of, such as "ebay_buyer_123", with his CGI handle. User B, communicating with User A under User A's "amazon_seller_123" screen name, may obtain from the GICS, via User A's CGI handle, information pertaining to User A's other screen names, such as "ebay_buyer_123". Continuing this example, from User B's perspective, while "amazon_seller_123" may appear to be a new Amazon.com® user with no proven track record, with the advent of this invention, User B may now be able to both obtain information associated with "ebay_buyer_123"; and, be assured that the same real person (User A) is behind both screen name.

Figure 6:
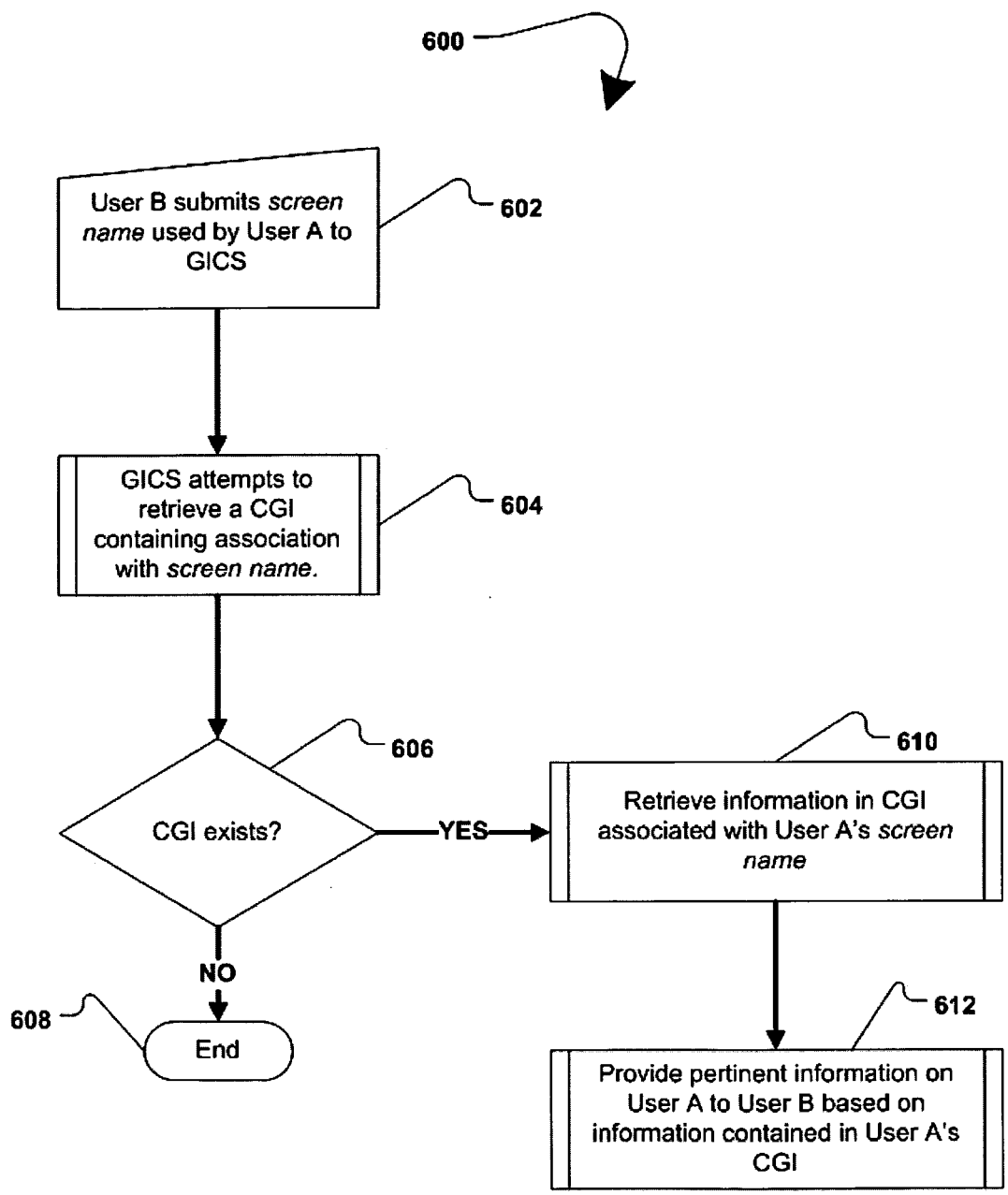
FIG. 6 is a generalized flow diagram illustrating a user's obtaining information associated with another user's CGI account or CGI handle, via the other user's screen name ("screen name"), according to one embodiment of the present invention.

FIG. 6 is a generalized flow diagram illustrating a user's obtaining information associated with another user's account ("CGI account") or handle ("CGI handle"), via the other user's screen name ("screen name"), according to one embodiment of the present invention.

At step 602, User B may submit to a GICS a screen name used by User A. For example, User A may submit a request for information associated by the GICS with a user using screen name "User A". The information provided to User B may be personal information associated with User A and/or information associated with any other screen names used by the same user using the screen name "User A", etc.

At step 604, the GICS may attempt to retrieve (e.g. from a database) a stored CGI account containing an association with the screen name inputted at step 602.

If it is determined at step 606 that no association exists for the screen name inputted at step 602 in any stored CGI account, at step 608 the flow may end. (e.g. User B may be notified the screen name they are searching for does not exist in a CGI account.) Since the screen name was not found, this may indicate to User B, that User A is unknown and User B may be more suspicious of User A.

In an alternate embodiment, at step 602, User B may input both the screen name and the CGI handle of User A. At step 604 the CGI account corresponding with the inputted CGI handle may be retrieved and examined for a stored association with the inputted screen name. This embodiment may save the GICS the task of examining all stored CGI accounts for a possible association with the inputted screen name.

If it is determined at 606, that an association with the inputted screen name in a CGI account has been found at step 604, at step 610 information associated with the found CG account may be retrieved (i.e information associated with User A's CGI handle and contained in the database.)

At step 612, information contained in User A's CGI account (i.e. with User A's screen name inputted at step 602) may be shared with User B (i.e. the requesting user who has provided User A's screen name at step 602.)

Please note that in this example flow diagram 600, at step 612 information associated with User A (i.e. contained in User A's CGI account) is provided to User B. In a preferred implementation of this invention, the information provided to User B may be limited by various factors. For example, User A may pre-determine the type of information to be provided automatically, User A may be asked to approve of specific information to be provided, information provided may vary depending on who the requesting user is, etc. For example, if User B is an anonymous user, User B may only obtain very basic automatically provided information about User A.

However, if User B is a known and trusted person to User A, much more information can be provided to User B.

Figure 7:
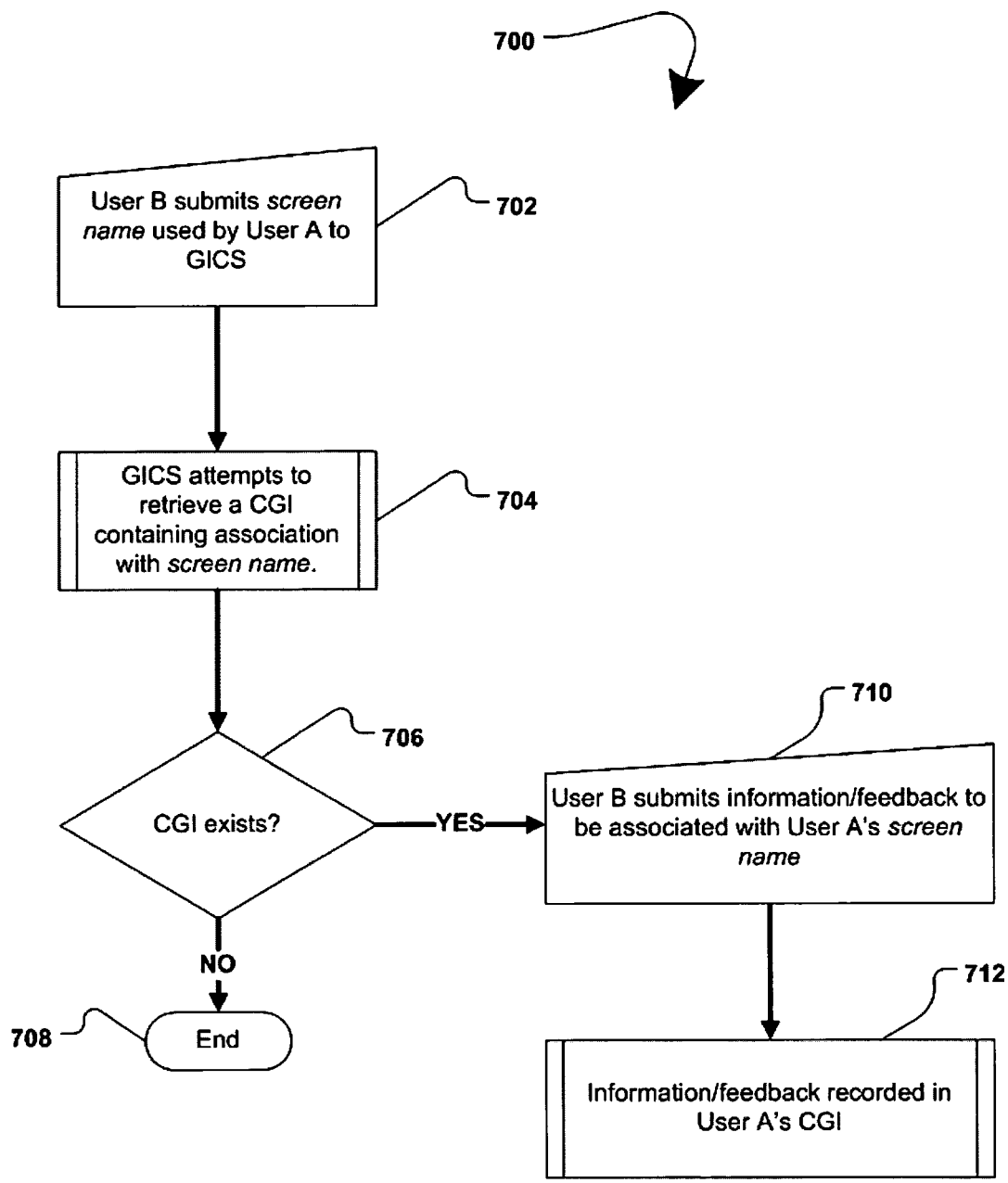
FIG. 7 is a generalized flow diagram illustrating a user's submitting information to be associated with another user's CGI account or CGI handle, via the other user's screen name ("screen name"), according to one embodiment of the present invention.

FIG. 7 is a generalized flow diagram illustrating a user's submitting information to be associated with another user's account ("CGI account") or handle ("CGI handle"), via the other user's screen name ("screen name"), according to one embodiment of the present invention.

For example, User B may have completed a buy/sell transaction with a user using a screen name "User A" and wishes to provide feedback on "User A". In another example, User B may engage in an online, social interaction with a user using a screen name "User A" and may wish to associated feedback with "User A".

At step 702, User B may submit the screen name (e.g. "User A") that User B wishes to associate feedback information with, to a GICS. For example, User B may enter the screen name of User A in a portal connected with the GICS. In an alternate embodiment, a portal or application used by User B may submit the screen name of User A—as well as associated information—to the GICS in a manner transparent to User B.

At step 704, a CGI handle associated with the submitted screen name may be sought. For example, a database accessible to the GICS may be searched for a CGI account data associated with the screen name submitted.

If at step 706 it is determined that the database does not contain CGI account data, associated with the screen name submitted, at step 708 the information obtaining process may terminate. If at step 706 it is determined that CGI account data associated with the submitted screen name does exist, step 710 may be executed.

At step 710, User B may submit information to be associated with the screen name "User A".

At step 712, information submitted at step 710 may be recorded (e.g. in a database accessible to the GICS) in association with the CGI account of User A.

For example, User B may have purchased an item from a user using screen name "User A" on eBay™. User B has received damaged goods and as a result, User B may wish to associate negative feedback with the screen name "User A". Another user "User C" may wish to purchase an item on Amazon.com™ from the same person using screen name "User A" on eBay™, except that user uses a different screen name "User D" on Amazon.com™. As per FIG. 6, User C may inquire the GICS about information associated with "User D". Since the CGI account used by "User D" is the same as the CGI account used by "User A", User C may now obtain the negative feedback entered by User B for User A.

Please note that in the example in flow diagram 700, it may be implied that User B manually requests to submit information to be associated with the CGI handle of User A. In the presently-preferred embodiment, the logic of flow diagram 700 may be executed automatically in some instances. For example, if User A and User B are the screen names of two individuals communication over instant messenger, actions by User B—for example adding User A as a friend, deleting User A from friends' list, blocking a communication from User A—may be automatically submitted as information associated with User A, generally following the logic shown in flow diagram 700.

Figure 8:
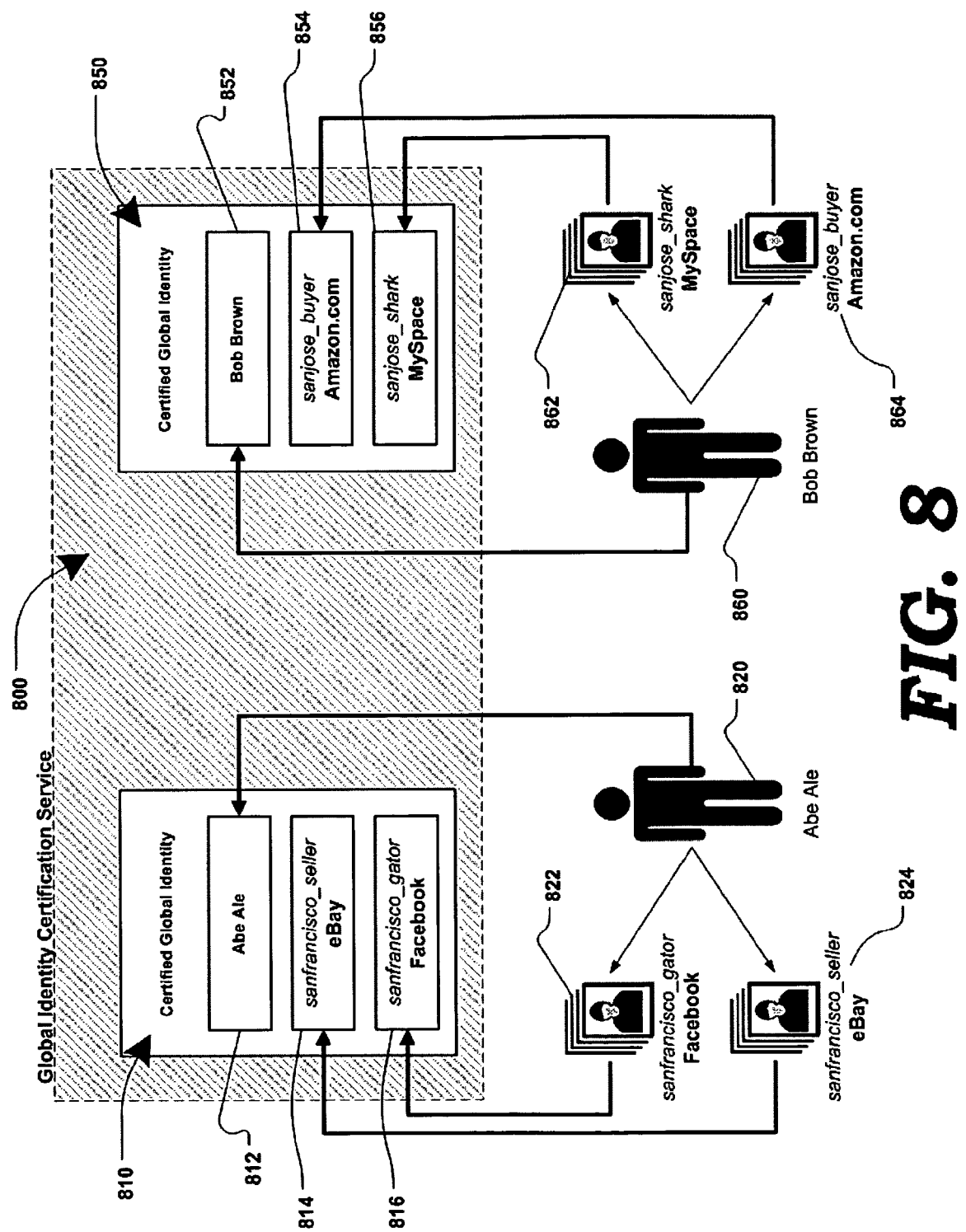
FIG. 8 is a generalized flow diagram illustrating CGI accounts, containing multiple user screen names, stored by a GICS, according to one embodiment of the present invention.

FIG. 8 is a generalized flow diagram illustrating CGI (Certified Global Identity) accounts ("CGI account"), containing multiple user screen names, stored by a GICS, according to one embodiment of the present invention.

A GICS 800 may be a hosted service accessible online, containing or having access to a database. The GICS 800 may store multiple CGI accounts 810 and 850 in the database.

In the presently-preferred embodiment, a single CGI account may be registered to a single real person. For example, a person 820 "Abe Ale" may have a single CGI account 810; a person 860 "Bob Brown" may have a single CGI account 850. In one embodiment, limiting a person to having a single CGI account may be accomplished by requesting and verifying personal information (e.g. social security number, drivers license number, etc.)

A person may use multiple screen names for various online interactions. For example, the person "Able Ale" 820 may use a screen name "sanfrancisco_gator" 816, issued by the website Facebook™, for social interactions on Facebook™. The person "Able Ale" may use a different screen name, for example "sanfrancisco_seller" 824, issues by eBay™ for buying/selling on eBay™. Likewise, the person "Bob Brown" 860 may use a screen name "sanjose_shark" 856, issued by the website MySpace™, for social interactions on MySpace™. The person "Bob Brown" 860 may use a different screen name, for example "sanjose_buyer" 854, issues by Amazon.com™ for buying/selling on Aamzon.com™.

A person's CGI account may contain references to various screen names used by the person. For example, the CGI account 810, used by the person Abe Ale 820 (a screen name field 812 may reference the real name of the person associated with the CGI 810), may contain references to the screen names used by Able Able 820: "sanfrancisco_seller on eBay" 814—corresponding to the screen name 824; and, "sanfrancisco_gator on Facebook"—corresponding to the screen name 822.

Similarly, the CGI account 850, used by a person Bob Brown 860 (A screen name field 852 may reference the real name of the person associated with the CGI 850), may contain references to the screen names used by Bob Brown 860: "sanjose_buyer on Amazon.com" 854—corresponding to the screen name 864; and, "sanjose_shark on MySpace"—corresponding to the screen name 862.

In alternate embodiments, multiple GICSs may exist. CGI accounts may exist in different GICSs. A user attempting to contact another user's CGI account, may, in one embodiment, query various GICSs until a GICS containing the other user's CGI account is located. In another embodiment, the GICS containing a user's CGI account may be made known to other users or shared in directory listings on each GICS so the GICS containing the CGI account can be determined from any GICS.

Figure 9:
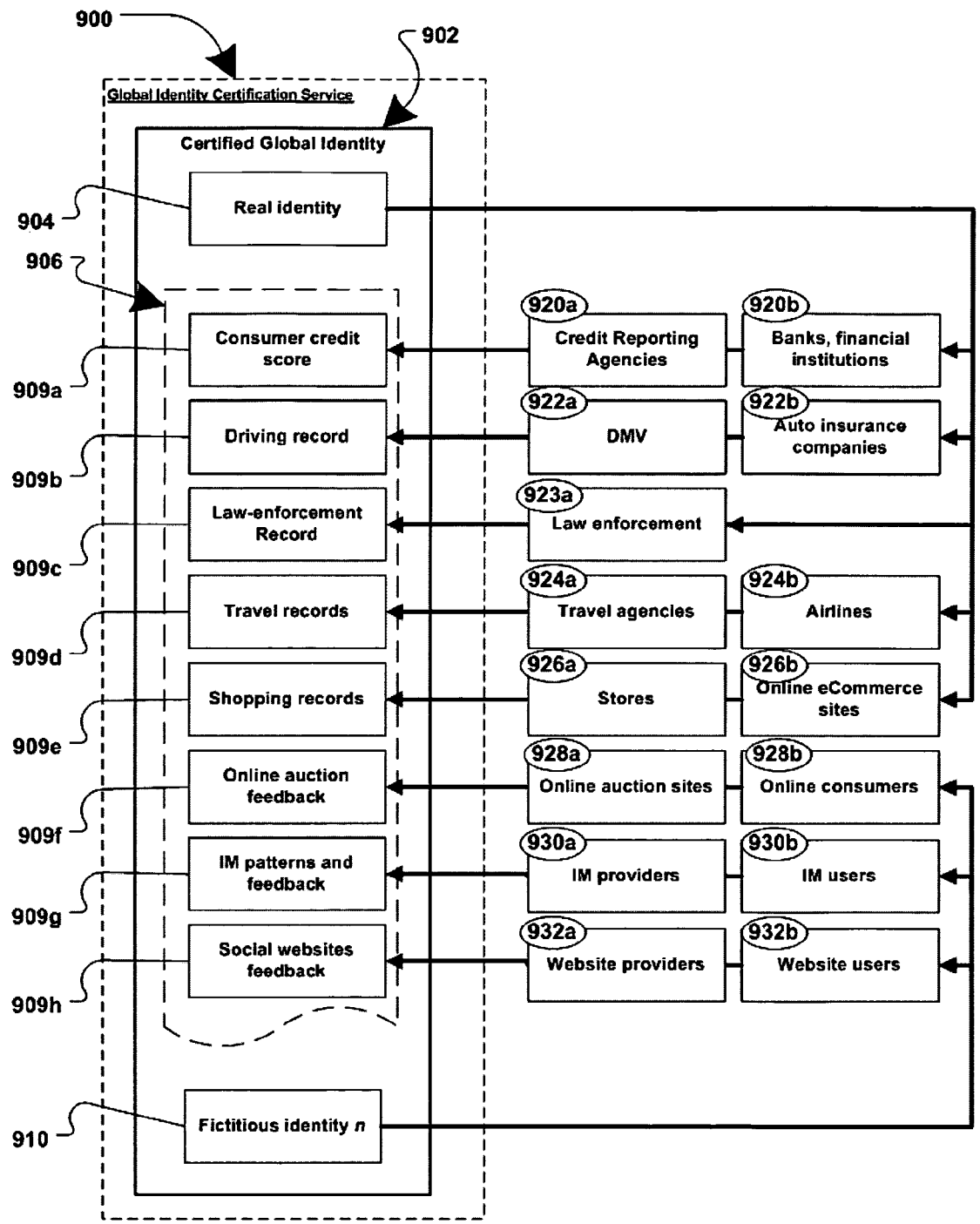
FIG. 9 is a generalized flow diagram illustrating a user's information aggregated into a CGI account stored by a GICS, according to one embodiment of the present invention.

FIG. 9 is a generalized flow diagram illustrating a user's information aggregated into a CGI account stored by a GICS, according to one embodiment of the present invention.

A GICS 900 may be a hosted service accessible online, containing/having access to a database. The GICS 900 may contain multiple CGI accounts, generally having a unique CGI account per individual (i.e. a real person as opposed to an online screen name/alias/fictitious identity.)

A CGI account 902 may be contain information related to a user's real identity, various screen names used, feedback from other users, web surfing habits, online commerce records, etc.

The CGI account 902 may contain a record of the real identity 904 (i.e. the legal name of the person who owns the CGI account, social security number, driver's license number, etc.) of an individual associated with the CGI account 902. In the presently-preferred embodiment, the real identity 904 may not be made available to other users, and may be used to aggregate and verify additional information to be associated with the user in the CGI account 902. In alternate embodiments, the real identity 904 in the CGI account 902 may be shared according to various rules and implementations (e.g. law enforcement may obtain real identity information stored in the CGI account associated with a screen name under criminal investigation.)

The CGI account 902 may contain an aggregated information section 906, which may include information gathered in relation to the user who owns CGI 902 (i.e. the user associated with the real identity 904.) Various types of data, from numerous sources, may be aggregated. For example:

A data section 909a may contain information pertaining to consumer credit scoring. Banks and financial institutions 920b, credit reporting agencies 920a, etc. may transmit credit score-related information to the CGI account 902, based on the real identity information 904. For example, the credit reporting agency may receive the real identity information 904 (e.g. social security number, first name, last name, etc.) and provide a credit score associated with this person.

a data section 909b may contain information pertaining to a person's driving record, auto insurance, etc. Auto insurance companies 922b, Departments of Motor Vehicles 922a, etc., may provide information based on the real identity information 904 provided to them.

a data section 909c my contain information pertaining to police/criminal/FBI/law-enforcement records of the person who owns the CGI record 902. For example, if the owner of the CGI record 902 attempts to contact a child or teenager on a social website using a fictitious identity/screen name 910 (also associated with this CGI account 902), a parent and/or the child may be automatically notified if there is a potential threat. Various threat indicators may be triggers for the notification. For example, if the system detects that the owner of the CGI record 902 is an older individual, the system may inform the child and/or parent that the CGI owner is not another child. In other embodiments, the system can inform the child and/or parent that the CGI owner has a criminal record, is on a predator list, is on a wanted list, etc. (e.g. the social website on which the person, using a fictitious screen name, contacts the teenager may automatically check for law-enforcement-related data in the CGI account of the person, and take action, such as notify the parent, based on the content of the data returned.)

A data section 909d may contain information pertaining to a person's travels. Travel agencies 924a, airlines 924b, hotels, etc., may provide information on the travel and hospitality habits of the person described in the real identity information 904. This information can be usefully for validating the identity of a traveling individual. A user with a history of travel can record this information and validate future travel purchases.

A data section 909e may contain information pertaining to a person's shopping activities. Stores 926a, online eCommerce websites 926b, etc., may provide information on the shopping habits of the person described in the real identity information 904. This information can be useful for validating purchases of an individual. For example, many credit card companies will cancel a credit card purchase if the purchase is out of character with the card holder. The inventive system can be used to cross reference activities based upon recorded data. A user may have recently purchased a house which results in a recordation of the house and the validation of increased home improvement purchasing activities.

A data section 909f may contain information pertaining to a person's online auction activities. Online auction websites 928a (e.g. eBay™, Amazon.com™, etc.) and online remote users/consumers 928B interacting the user via fictitious screen names, may provide information on the online auction habits and track record of the person described in the real identity information 904. Thus, the system can determine when a user has simply changed a user name to prevent others from seeing associated negative reviews or a negative transaction history.

Data section 909g and 909h may aggregate information associated with the online social interactions (e.g. via social websites such as Facebook™, instant messaging services such as AOL™, Yahoo!™, etc.) of the user whose real identity 904 is included in the CGI 902. Instant messenger providers 930a, instant messenger users 930b, social websites 932a, social website users 932b, etc. may provide information to be included in the data sections 909g and 909h. This information can include linked friends, blocked individuals, volume of communications, etc.

Please note that the data sections 909a-909h, in the information section 906, are presented and delineated in a certain way for exemplary purposes only. Other types of information, associated with the fictitious screen names 910 of the user of the real identity 904, may be reported to the GICS 900 by any number of external entities 920a-932b.

Figure 10A:
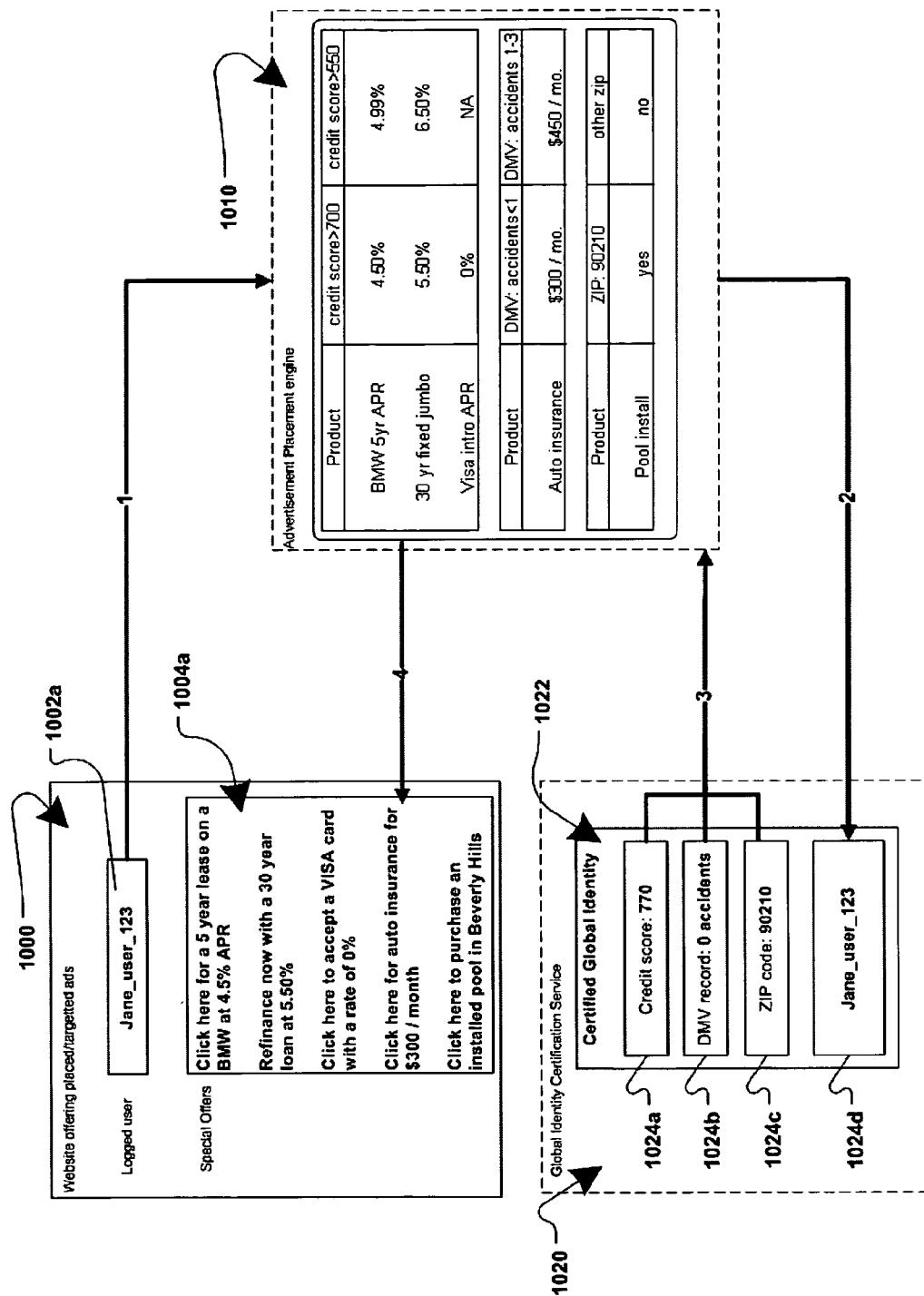
FIGS. 10A and 10B are generalized block diagrams illustrating the usage of a GICS and a CGI for targeted advertising, according to one embodiment of the present invention.
Figure 10B:
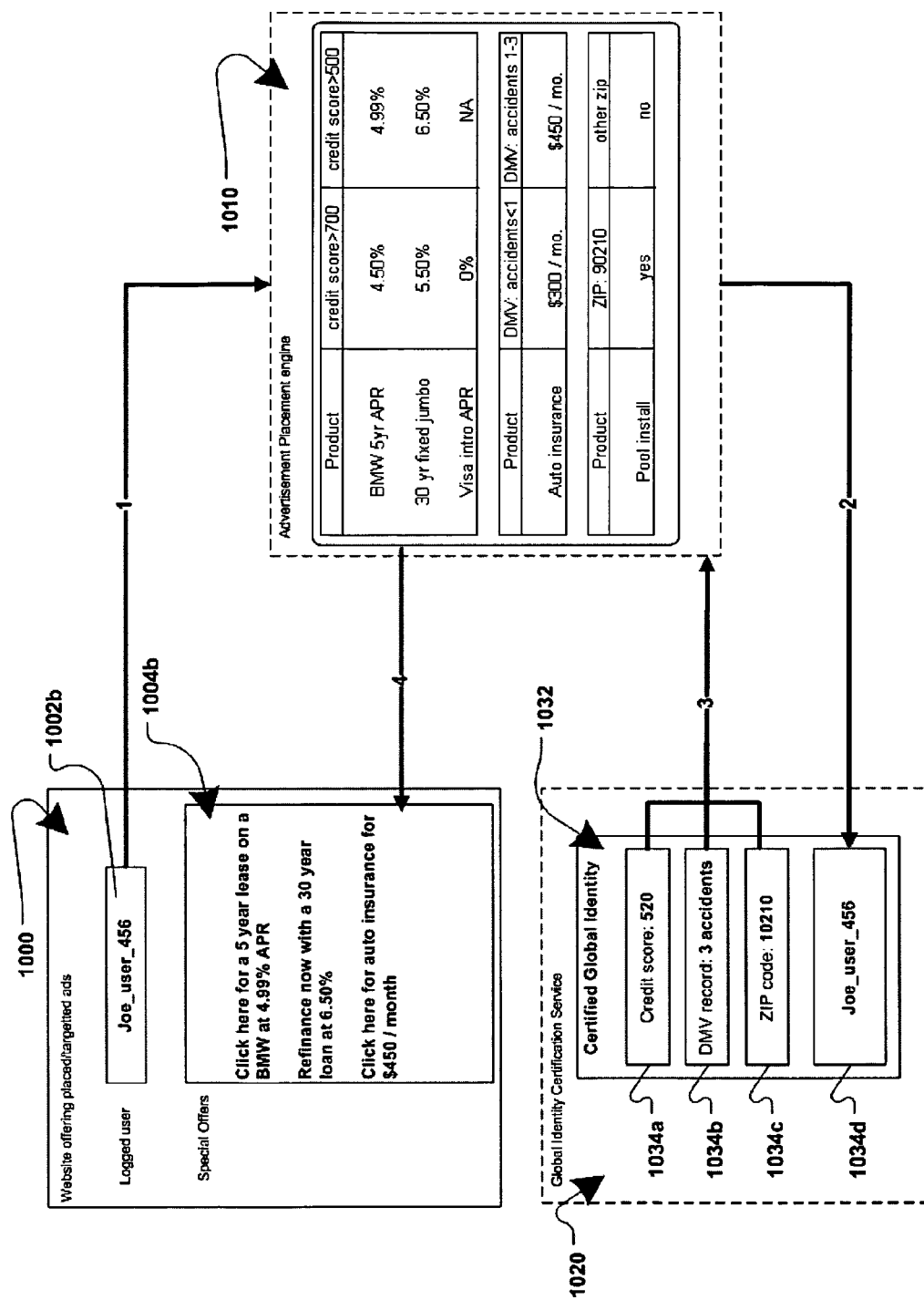

FIGS. 10A and 10B are generalized block diagrams illustrating the usage of a GICS and a CGI for targeted advertising, according to one embodiment of the present invention. Targeting advertising to internet users is often difficult as a user may use one or more fictitious identities/screen names which an advertiser may not be able to correlate to a real person and the real person's social and financial attributes.

For example, in prior art, two people "Jane_user_123" and "Joe_user_123" logging onto a website may receive the same advertised offers from an advertising placement engine/service. In this example, an advertising placement engine may present similar offers to both users, being unable to ascertain the financial and social attributes of the two real people behind the fictitious screen names.

Referring to FIG. 10A, the user of the fictitious screen name "Jane_user_123" 1002a may log into a website 1000. The fictitious screen name 1002a may be transmitted to the advertising placement engine 1010. The advertising placement engine 1010 may contain various marketing offers, contingent on financial and civic attributes of an individual using a fictitious screen name.

The advertising placement engine 1010 may query a GICS 1020 for a CGI 1022 containing an association with the fictitious screen name "Jane_user_123" 1024d. Attributes associated with the fictitious screen name "Jane_user_123" 1024d, contained in the CGI 1022 (in this example, "zipcode 90210" 1024c, "DMV record 0 accidents" 1024b, "credit score 770" 1024a, etc.) may be transmitted back to the advertising placement engine 1010.

With the advent of the new attributes 1024a-1024c associated with the fictitious screen name "Jane_user_123" 1002a, the advertising placement engine 1010 may transmit to the website 1000 advertisement targeted specifically for a person with those attributes. For example, an advertising section 1004a of the website 1000 may present the user with tailored promotions (e.g. "a 5 year lease on a BMW at 4.5% APR" available only to an individual whose credit score is greater than 700, LA area and possibly less than 2 accidents, for which the user "Jane_user_123" 1002a qualifies, based on her credit score of "770" 1024a 90210 zip code 1034c and 0 accidents 1024b.)

Referring now to FIG. 10B, a different user "Joe_user_456" 1002b may visit the website 1000, which may result in different advertisement being displayed by the advertising section 1004b. The fictitious screen name "Joe_user_456" 1002b may be transmitted to the advertising placement engine 1010. The advertising placement engine 1010 may query the GICS 1020 for a CGI 1032 containing an association with the fictitious screen name "Joe_user_456" 1034*d*. Attributes associated with the fictitious screen name "Joe_user_456" 1034*d*, contained in the CGI 1032 (in this example, "zipcode 10210" 1034*c*, "DMV record 3 accidents" 1034*b*, "credit score 520" 1034*a*, etc.) may be transmitted back to the advertising placement engine 1010.

With the advent of the new attributes 1034*a*-1034*c* associated with the fictitious screen name "Joe_user_456" 1034*d*, the advertising placement engine 1010 may transmit to the website 1000 advertisement targeted specifically for a person with those attributes. For example, the advertising section 1004*b* of the website 1000 may present the user with tailored promotions (e.g. "a 5 year lease on a BMW at 4.99% APR" available only to an individual whose credit score is greater than 500 and less than 700, any area and possibly less than 4 accidents, for which the user "Joe_user_456" 1002*d* qualifies, based on his credit score of "520" 1034*a* and 3 accidents 1034*c*.)

According to the embodiments described above, various people visiting a single website while using fictitious screen names, may be presented with targeted advertisement based on social, financial and other attributes of the real people using the various fictitious screen names. In alternate embodiments other methods of querying CGIs and using the information retrieved, for advertising purposes, may be used.

Figure 11A:
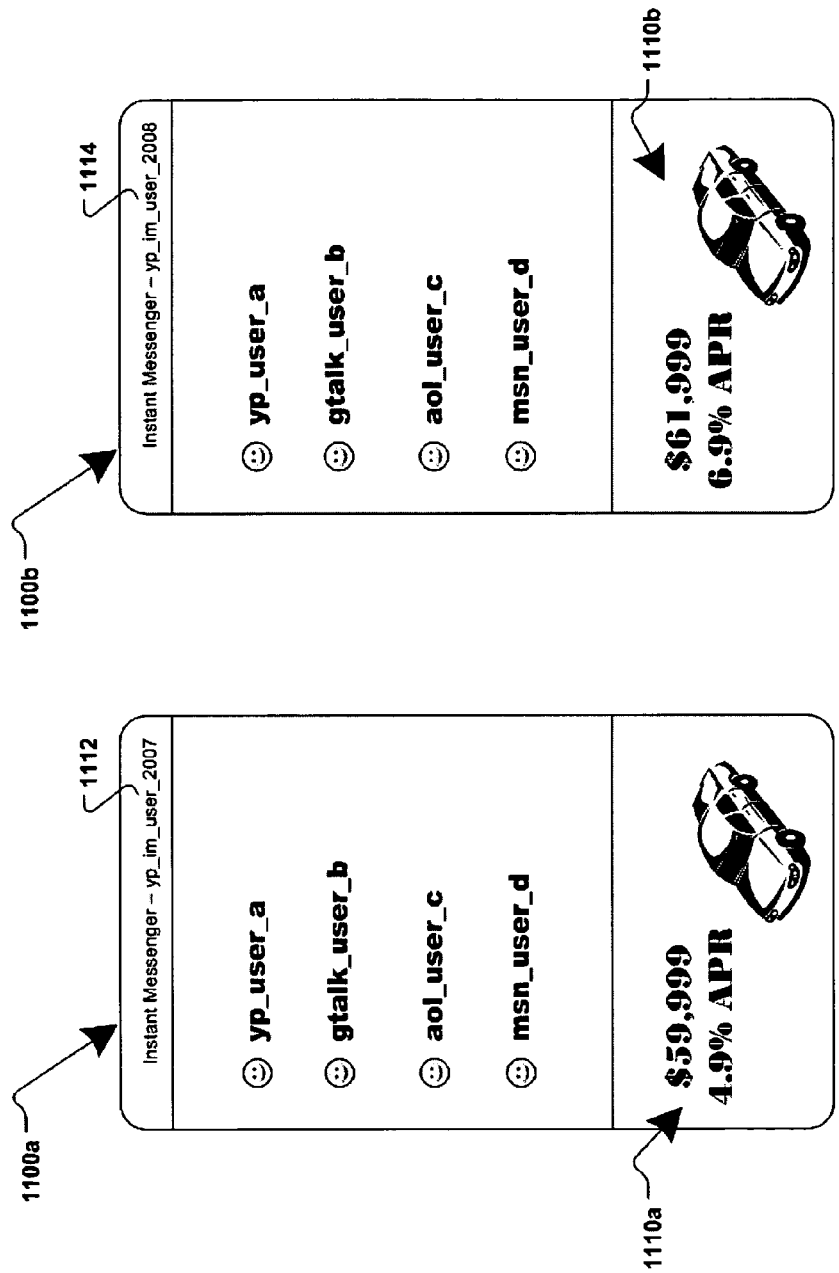
FIGS. 11A and 11B are generalized block diagrams illustrating the usage of a GICS and a CGI for targeted advertising in instant messaging ("IM"), according to one embodiment of the present invention.
Figure 11B:
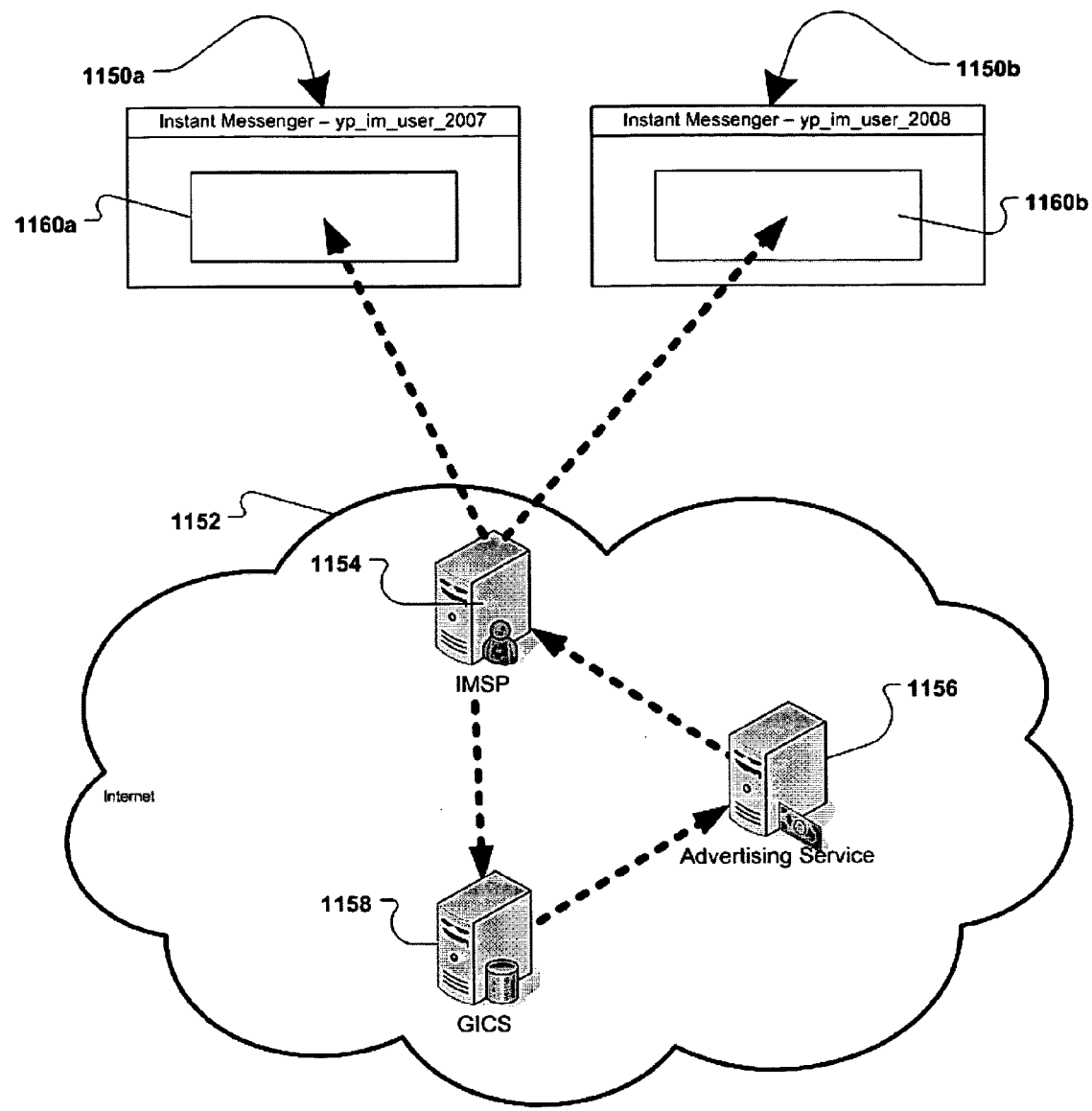

FIGS. 11A and 11B are generalized block diagrams illustrating the usage of a GICS and a CGI for targeted advertising in instant messaging ("IM"), according to one embodiment of the present invention. At present, people can obtain multiple fictitious screen names for use in connection with IM. A minimal amount of personal information may be required for obtaining a fictitious screen name from IM service providers ("IMSP") such as Yahoo!®, Google Talk®, AOL®, Microsoft Windows Messenger®, etc. In addition, a fictitious screen name issued by one IMSP may be used by IM applications of another IMSP; thus, personal information provided to the one IMSP may not be accessible by the other IMSP.

Referring to FIG. 11A, an IM application, running on an electronic device, may display advertisement to a user logged into the IM application. In this example, the IM application is shown in two states: as an IM application 1100*a* while a user "yp_im_user_2007" 1112 is logged in; and, as an IM application 1100*b* while another user "yp_im_user_2008" 1114 is logged in.

In the prior art, an advertisement (e.g. an advertisement content 1110*a*/1110*b*) may be displayed to all users of the IM application. For example, at present, millions of IM applications synchronize with their IMSP to retrieve advertisement content. Since at present, there is no way to correlate fictitious screen names with real people—and obtain the social and financial attributes of these people—there is no way to customize the advertisement content based on the user logged into an IM application. Thus, in this example, the millions of IM applications may display the same advertisement content regardless of the user logged in.

In the presently-preferred embodiment, the advertisement content may be customized to the specific user logged into the IM application. When the user "yp_im_user_2007" 1112 is logged into the IM application 1100*a*, the advertisement content 1110*a* (e.g. offering a car for $59,999 at 4.9% APR) may be displayed in the IM application 1100*a*. When another user "yp_im_user_2008" 1114 is logged in the IM application 1100*b*, a different advertisement content 1110*b* may be displayed (e.g. offering a car for $61,999 at 6.9% APR) based upon different attributes of the new user.

In the presently-preferred embodiment, the advertisement content displayed may be based on social and financial attributes associated with a person through the fictitious screen name he/she uses. Referring now to FIG. 11B, online/IM-based advertising may be based on attributes associated with the fictitious screen name of the user logged into an IM service.

An IM application (e.g. a 32-bit computer application, an application on a portable electronic device, a web browser, etc.) may communicate with remote IM users over the internet. In FIG. 11B, an IM application is shown in two states, designated as 1150*a* when used by the user "yp_im_user_2007" and as 1150*b* when used by the user "yp_im_user_2008". The IM application 1150*a*, used by the user "yp_im_user_2007", may communicate with an IMSP 1154 over a network 1152 (e.g. the internet.) An advertisement content 1160*a* may be generated by an advertisement service 1156, and displayed in the IM application 1150*a*.

In the present embodiment, the advertisement service 1156 may obtain the fictitious screen name (i.e. "yp_im_user_2007") from the IMSP 1154, obtain social and financial attributes of the user (i.e. "yp_im_user_2007" on the IM application 1150*a*) from a GICS 1158, and display the advertisement content 1160*a* based on the social and financial attributes retrieved.

An advertising content 1160*b*, displayed on the IM application 1150*b* with the user "yp_im_user_2008" logged on, may be different from the advertising content 1160*a*. The advertising service 1156 may obtain different social and financial attributes for of the user of the fictitious screen name "yp_im_user_2008" than for the user of the fictitious screen name "yp_im_user_2007", and based on the different attributes, the advertising content may change.

As illustrated in FIG. 11A and FIG. 11B, a real-life example may involve a User A logging into an IM application and receiving advertisement content tailored to social and financial attributes attributed to the person using the screen name User A. A second user, using a fictitious screen name User B, may log into the same IM application and receive potentially different advertising content, based on social and financial attributes associated with the person behind the factitious screen name User B. In alternate embodiments, electronic advertisement content, on any website or network (e.g. IM, social interaction portals, intranets, shopping and auction websites, etc.) may be targeted based on social and financial attributes associated with the users using fictitious screen names.

Figure 12:
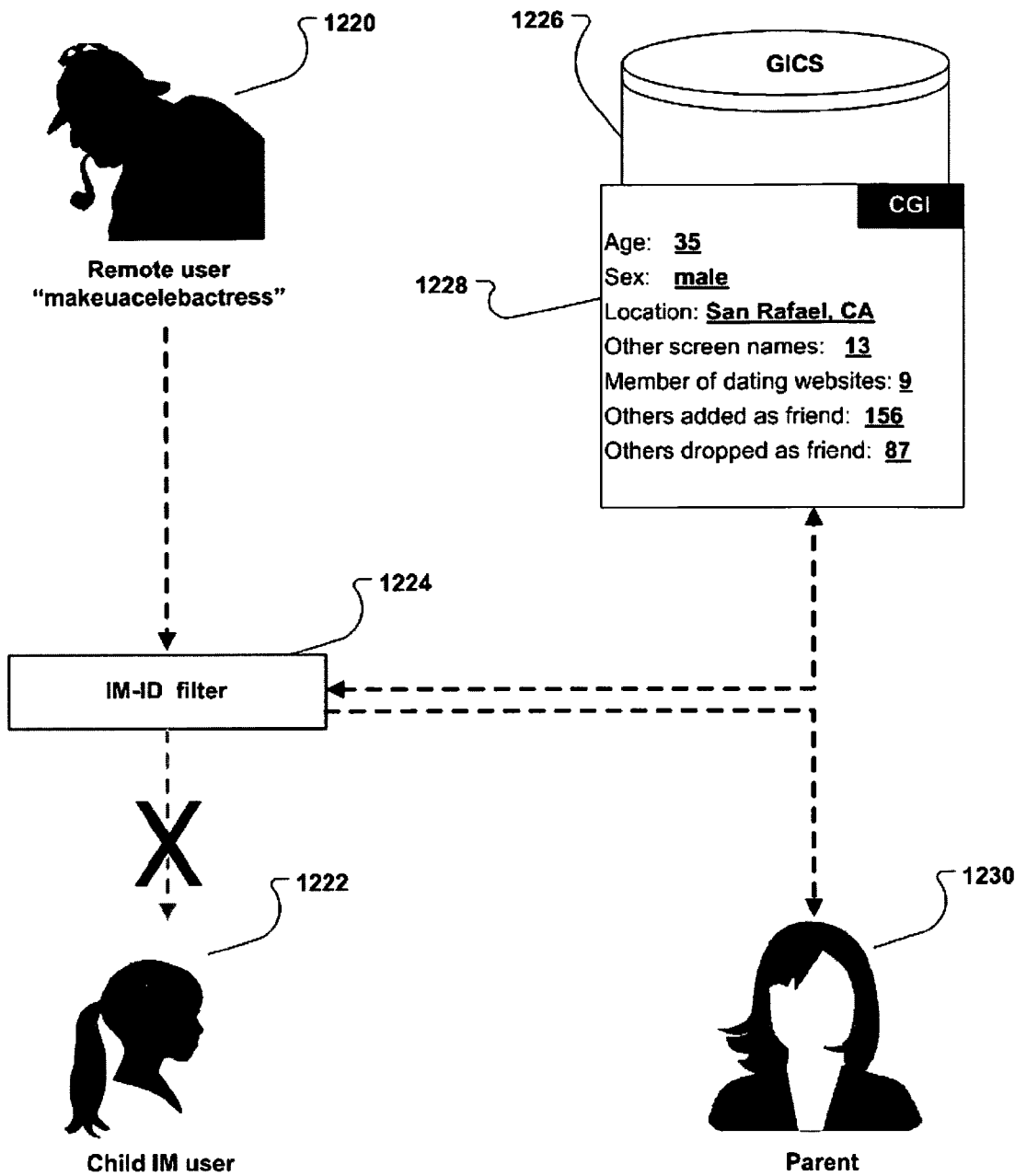
FIG. 12 is a generalized block diagram illustrating the use of a GICS as a form of parental control for online interactions, according to one embodiment of the present invention.

FIG. 12 is a generalized block diagram illustrating the use of a GICS as a form of parental control for online interactions, according to one embodiment of the present invention. Online interactions may take place via instant messaging ("IM") and in the form of text, audio, video etc.

An IM user may use a screen name to communicate with remote IM users, who use different screen names. An IM user may provide false information about their real identity. The service providing the IM communication (e.g. Yahoo!®, Google®, AOL®, MSN®, etc.) may not collect and/or validate and/or share with others, personal information of a user obtaining a screen name from the IM service. Even if an IM service collected, validated and shared with other users, personal information, the IM service may not have a way of monitoring other activities by the same individual using different screen names—especially on other IM services.

An IM identity filter ("IM-ID filter") may obtain information associated with the screen name of the IM user sending an IM communication, and based on that information may take automatic action such as routing, recording and/or flagging the IM communication.

A remote user 1220 (in this example having a screen name "makeuacelebactress") may send an IM communication to a user 1222 (in this example, "child IM user".) An IM-ID filter 1224 may intercept the IM communication. The IM-ID filter 1224 may be a component of the child IM user's 1222 IM client application, or a computer application associated with the child IM user's 1222 IM client application, or a firewall component, or an application on a network/intranet/internet, or a component of the IMSP's IM hardware/software, etc.

The IM-ID filter 1224 may communicate with a GICS 1226 to obtain information associated with the screen name "makeuacelebactress" used by remote IM user 1220. The IM-ID filter 1224 may communicate with one or more GICSs 1226 over any electronic network (e.g. the internet) and via any electronic communications protocol, such as http, https, ftp, etc.

The IM-ID filter 1224 may obtain from the GICS 1226 a CGI certificate 1228 associated with the screen name "makeuacelebactress" of the remote IM user 1220. The CGI certificate 1228 may include various personal and aggregated information associated with the user using the screen name "makeuacelebactress" 1220 (e.g. the user's age, verified location, gender, number of other screen names/aliases used, number of dating websites the user is member of, number of other users who have added and/or removed the user from their friends' lists, etc.)

In the presently-preferred embodiment, rules may be set and applied to IM-ID filter 1224 indicating the action to take automatically based on information contained in the CGI certificate 1228. For example, according to one possible rule, a supervisor (e.g. parent, teacher, employer, etc.) may be automatically notified (e.g. via an IM message, an email, a cellular phone sms message, etc.) when the an IM communication is received from a remote IM user with a screen name whose associated CGI meets certain criteria (e.g. screen name is not associated with a valid CGI, information contained in the user's CGI does/does not meet various predetermined criteria, etc.)

In an alternate embodiment, the IM-ID filter 1224 may reject IM communications from remote IM users whose CGI meets criteria for rejection. For example, an IM communication sent from the remote IM user makeuacelebactress 1220 to the IM user child IM user 1222 may not be displayed to the intended recipient—child IM user 1222—if the IM-ID filter 1224 rejects the IM communication based on information on the screen name makeuacelebactress obtained in the CGI certificate 1228. In alternate embodiments a combination of the actions above may be automatically performed by the IM-ID filter 1224. For example, blocking an IM communication and notifying a supervising person and reporting the IM communication to the GICSs 1226 for inclusion in the remote user's CGI 1228, etc.

Please note that FIG. 12 depicts a social, online interaction specifically via IM. IM is one common way to interact online—chat rooms, forums, blogs, social websites, etc.—are other common forms. An analogous algorithm may be used for assisting with parental control over other forms of online interactions, according to other embodiments of the present invention. Similarly, an analogous algorithm may be used in corporate environments, where electronic communications to a user may be blocked and/or re-routed based on attributes associated with the sending user's CGI stored by a GICS service.

Figure 13A:
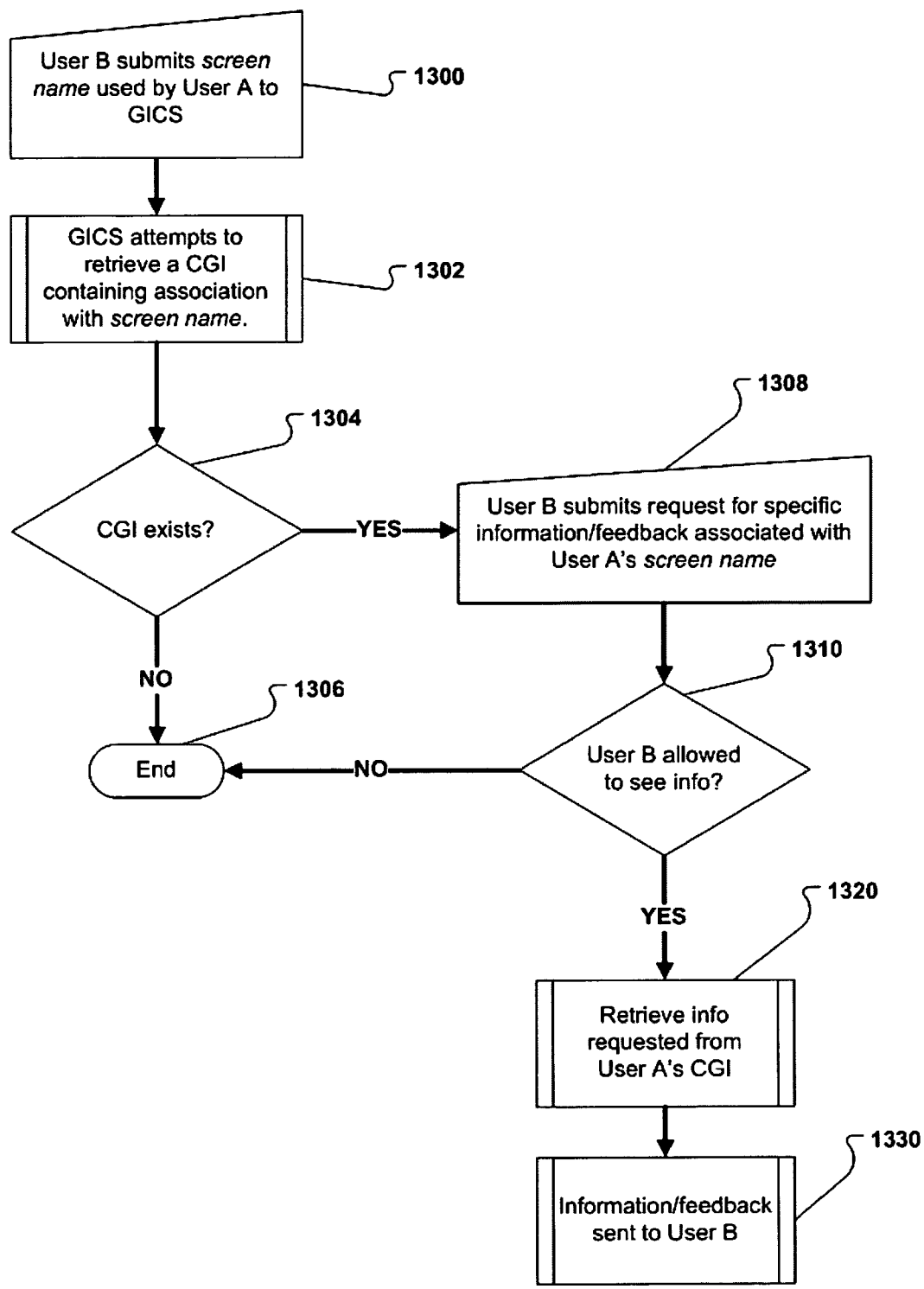
FIGS. 13A and 13B are generalized flow diagrams illustrating a User B's obtaining information associated with a User A from the User A's CGI handle, according to various embodiment of the present invention.
Figure 13B:
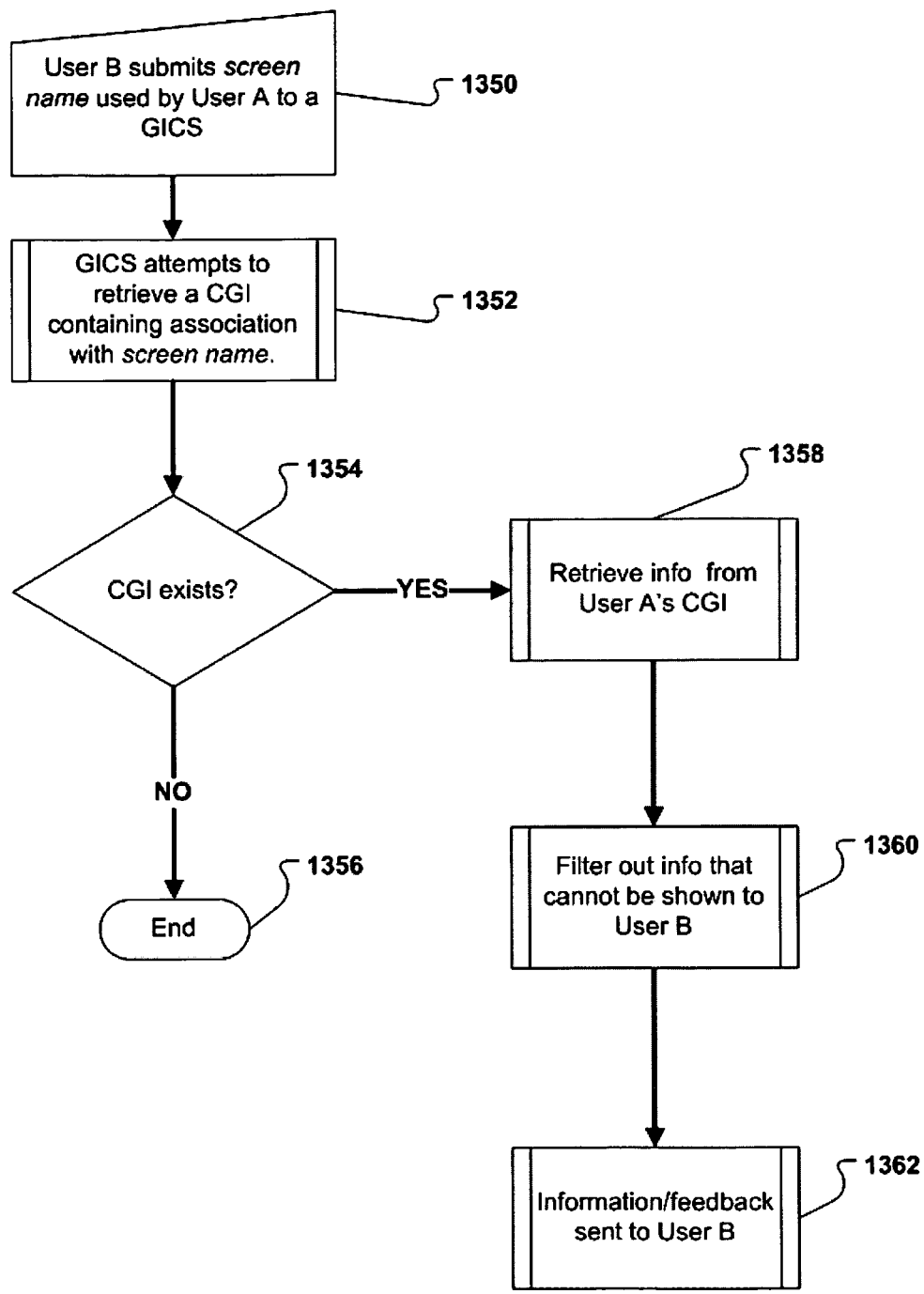

FIGS. 13A and 13B are generalized flow diagrams illustrating a User B's obtaining information associated with a User A from the User A's CGI handle, according to various embodiment of the present invention. A user ("requesting user") may submit a fictitious screen name (e.g. the fictitious screen name of another user "remote user") to a GICS. The GICS may retrieve a CGI associated with the fictitious screen name of the remote user, and then transmit to the requesting user some information associated with the remote user, stored in the remote user's CGI.

Referring to FIG. 13A, at step 1300, a User B may submit a fictitious screen name associated with a User A to a GICS. For example, the User B may be engaged in an electronic transaction with User A (in this example the fictitious screen name of User A may be "User A") and may submit the fictitious screen name "User A" to the GICS.

At step 1302, the GICS may search for the existence of a CGI containing an association with the fictitious screen name "User A". A CGI may have multiple associated fictitious screen names and a plurality of CGIs may be searched to identify the CGI containing the association with "User A".

If at step 1304 it is determined that no CGI, containing an association with the fictitious screen name "User A", exists, at step 1306 User B may be notified that the fictitious screen name "User A" is not associated with any CGI. For example, User A may have not submitted the fictitious screen name "User A" to the GICS to be associated with the CGI. In this example, User B may decide to decline doing business with User A, as no personal information on User A may be verifiable.

If at step 1306 it is determined that the CGI, associating the fictitious screen name "User A" with the CGI exists, at step 1308, User B may submit a request for specific information associated with User A. In this example, involving a financial transaction, User B may request the credit score of User A and other user feedback on previous transactions involving User A, and contained in the CGI.

At step 1310 it may be determined whether User B's request for the information may be allowed. In one embodiment, User A may be notified of User B's request and may be have to approve any or all information to be transmitted to User B. In an alternate embodiment, a set of rules may be followed automatically by the GICS, determining what part of the information may be transmitted to User B. For example, the GICS may query User B's CGI automatically and based on whether User B's CGI exists, and what information it contains, the information requested from User A's CGI may be transmitted to User B. In alternate embodiments, other manual and automatic rules and procedures may be followed to determine what portion of the information may be transmitted.

If it is determined at step 1310 that the requesting User B is allowed to receive the information, at step 1320, the information may be retrieved from the CGI, and at step 1330, the information may be transmitted to User B. (e.g. electronically, via email or in whatever manner requested.)

Referring now to FIG. 13B, selective information may be made available to an inquiring user. At step 1350, a User B may submit a fictitious screen name associated with a User A to a GICS. For example, the User B may be engaged in an electronic transaction with User A (in this example the fictitious screen name of User A may be "User A") and may submit the fictitious screen name "User A" to the GICS.

At step 1352, the GICS may search for the existence of a CGI containing an association to the fictitious screen name "User A". A CGI may have multiple associated fictitious screen name and a plurality of CGIs may be searched to identify the CGI containing the association with "User A".

If at step 1354 it is determined that no CGI, containing an association with the fictitious screen name "User A" exists, at step 1356 User B may be notified that the fictitious screen name "User A" is not associated with any CGI. For example, User A may have not submitted the fictitious screen name "User A" to the GICS to be associated with the CGI. In this example, User B may decide to decline doing business with User A, as no personal information on User A may be verifiable. Alternatively, User B may question User A about the lack of information on the GICS and request that User A provide information. If User A declines to provide information User B may then elect to avoid doing business with User B.

If at step 1354 it is determined that the CGI, associated with the fictitious screen name "User A" exists, at step 1358, information associated with User A may be retrieved from the CGI. In this example, involving a financial transaction, User B may request the credit score of User A and other user feedback on previous transactions involving User A, and contained in the CGI.

At step 1360 the system may be determine what part of the information retrieved may be transmitted to User B. In one embodiment, User A may be notified of User B's request and may be have to approve all information to be transmitted to User B. In an alternate embodiment, a set of rules may be followed automatically by the GICS, to determine what part of the information may be transmitted to the User B. For example, the GICS may query User B's CGI automatically and based on whether User B's CGI exists, and what information it contains, the information requested from User A's CGI may be transmitted to User B. In alternate embodiments, other manual and automatic rules and procedures may be followed to determine what portion of the information may be transmitted.

At step 1362, the part of the information determined at step 1360 may be transmitted to User B. Please note that many possible embodiments—both automatic and manual—may exist for determining what portion of the information associated with User A, requested by User B, may be transmitted to User B.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for retrieving verifiable personal information associated with a fictitious user name, in an electronic communications system, comprising:
   providing a Global Identity Certification Service ("GIGS") containing a plurality of Certified Global Identity ("CGI") records, coupled to the internet; wherein each of the CGI records contains at least one fictitious user name and at least some verifiable personal information;
   receiving the fictitious user name from a remote user;
   determining the CGI record containing the fictitious user name;
   retrieving the verifiable personal information from the CGI record; and
   wherein a set of rules within the CICS determines the portion of the verifiable personal information transmitted to the remote user;
   wherein the at least some of the verifiable personal information does not divulge the identity of an individual associated with the fictitious user name.

2. The method in claim 1, further comprising:
   receiving transaction information from the remote user, wherein a portion of the verifiable personal information that has been retrieved is transmitted to the remote user based upon the transaction information.

3. The method of claim 1, further comprising:
   determining a portion of the personal information transmitted to the remote user based upon information settings provided by the owner of the CGI.

4. A method for exchanging select personal information between a first user and a second user, the first user and the second user each using fictitious user names, in an electronic communications system, comprising:
   receiving from the first user the fictitious user name used by the second user;
   identifying a Certified Global Identity ("CGI") record in a Global Identity Certification Service ("GIGS"), wherein the CGI record contains verified information associated with the fictitious user name used by the second user;
   determining a portion of the verified information in the CGI record to transmit to the first user; and
   determining the portion of the verified information step further compromises using a rule set by the second user; and
   transmitting the portion of the verified information in the CGI record to the first user.

5. The method of claim 4, wherein determining the portion of the verified information step further comprises receiving permission to transmit the portion of the verified information from the second user.

6. The method of claim 4, wherein identifying the CGI record further includes searching a database containing a plurality of CGI records.

7. The method of claim 6, wherein the database is external to the GICS.

8. The method of claim 1, wherein the verifiable personal information is verified by an accredited authority.

9. The method of claim 1, wherein the accredited authority is external to the GICS.

10. The method of claim 4, wherein the verified information includes personal information submitted by the first user.

11. The method of claim 10, wherein the personal information is verified by an accredited authority.

* * * * *